US011658744B1

(12) United States Patent
Rathinasamy et al.

(10) Patent No.: US 11,658,744 B1
(45) Date of Patent: May 23, 2023

(54) RECONFIGURABLE INTELLIGENT SURFACE (RIS)/LIGHT FIDELITY (LIFI) RACK COMMUNICATION SYSTEM

(71) Applicant: Dell Products L.P., Round Rock, TX (US)

(72) Inventors: Shree Rathinasamy, Round Rock, TX (US); Per Henrik Fremrot, Novato, CA (US); Maunish Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/680,726

(22) Filed: Feb. 25, 2022

(51) Int. Cl.
*H04B 10/00* (2013.01)
*H04B 10/114* (2013.01)
*H04L 41/0816* (2022.01)
*H04J 14/00* (2006.01)

(52) U.S. Cl.
CPC ...... *H04B 10/1149* (2013.01); *H04L 41/0816* (2013.01)

(58) Field of Classification Search
CPC ... H04B 10/11; H04B 10/114; H04B 10/1141; H04B 10/1143; H04B 10/1149
See application file for complete search history.

(56) References Cited

U.S. PATENT DOCUMENTS 9,716,548 B2 * 7/2017 Davidson ........... H04B 10/1149

* cited by examiner

*Primary Examiner* — Daniel G Dobson
(74) *Attorney, Agent, or Firm* — Joseph Mencher

(57) ABSTRACT

A Reconfigurable Intelligent Surface (RIS)/Light Fidelity (LiFi) rack communication system includes a rack that includes a computing device, a LiFi device that transmits first light-modulated data, and a RIS system. The RIS system includes a RIS device that directs the first light-modulated data transmitted by the LiFi Device at the computing device, and a RIS control subsystem that is coupled to the at least one RIS device. The RIS control subsystem determines a first signal integrity of the first light-modulated data received by the computing device via the RIS device when the RIS device includes a first configuration, and reconfigures the RIS device with a second configuration such that the first light-modulated data received by the computing device via the RIS device includes a second signal integrity that is greater than the first signal integrity.

20 Claims, 18 Drawing Sheets

US 11,658,744 B1

RECONFIGURABLE INTELLIGENT SURFACE (RIS)/LIGHT FIDELITY (LIFI) RACK COMMUNICATION SYSTEM

BACKGROUND

The present disclosure relates generally to information handling systems, and more particularly to providing communications for information handling systems in a rack using Light Fidelity (LiFi) and at least one Reconfigurable Intelligent Surface (RIS).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking device (e.g., switch devices), storage systems, and/or other computing devices known in the art, are often connected together via cabling in order to allow for communications between those computing devices. However, the cabling of computing devices together presents some issues. For example, in high-density computing device deployments such as datacenters, as the number of computing devices utilized in racks and/or other multi-computing-device chassis grows, the amount of cabling required to connect those computing devices grows as well, and significant time and resources are required in order to provide those cabled connections.

Accordingly, it would be desirable to provide a computing device rack communication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Reconfigurable Intelligent Surface (RIS) control engine that is configured to: determine a first signal integrity of first light-modulated data that is transmitted by a Light Fidelity (LiFi) device and received by a computing device via a RIS device when the RIS device includes a first configuration that directs the first light-modulated data transmitted by the LiFi device at the computing device; and reconfigure the RIS device with a second configuration that directs the first light-modulated data transmitted by the LiFi device at the computing device such that the first light-modulated data received by the computing device via the RIS device includes a second signal integrity that is greater than the first signal integrity.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
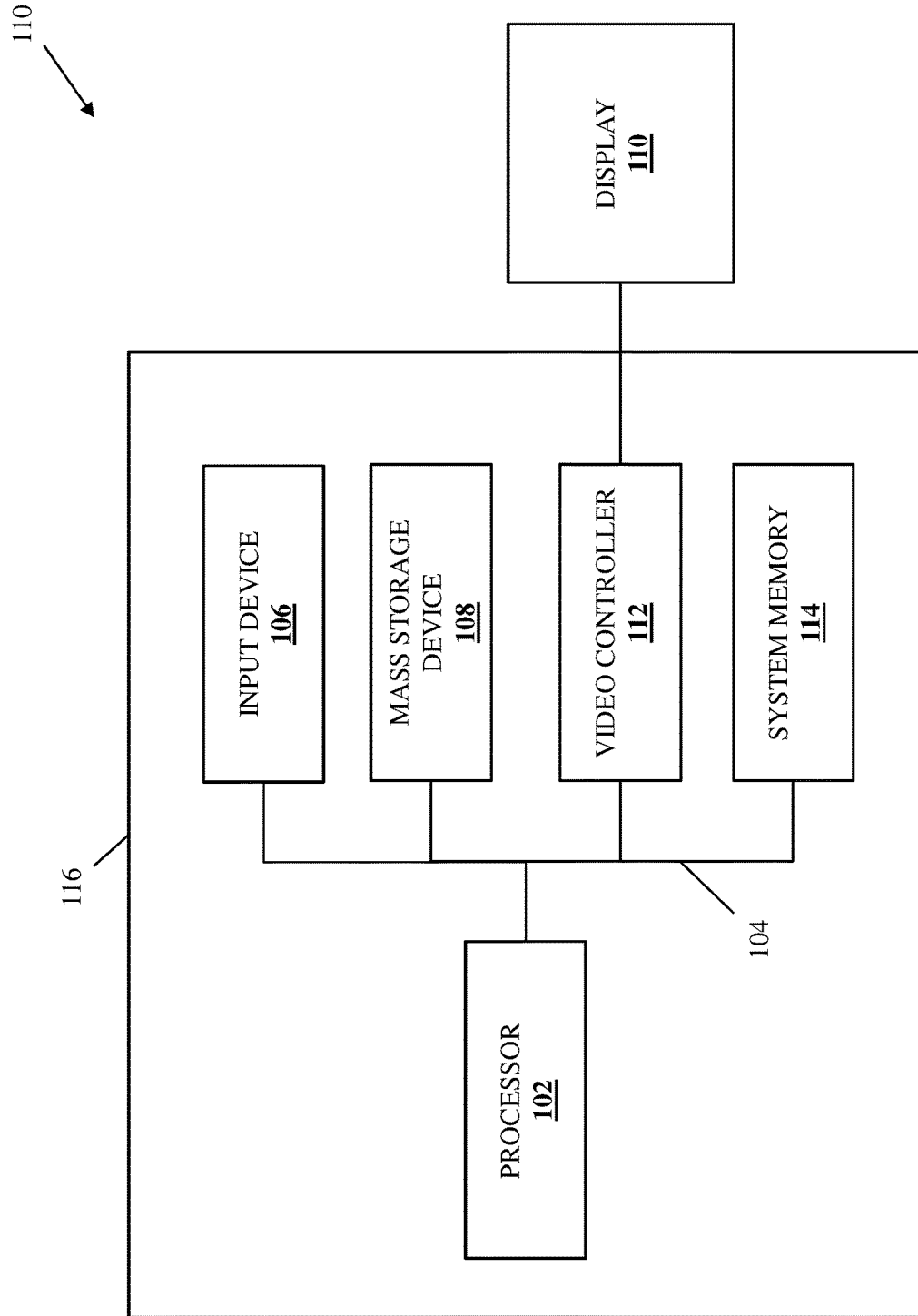
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
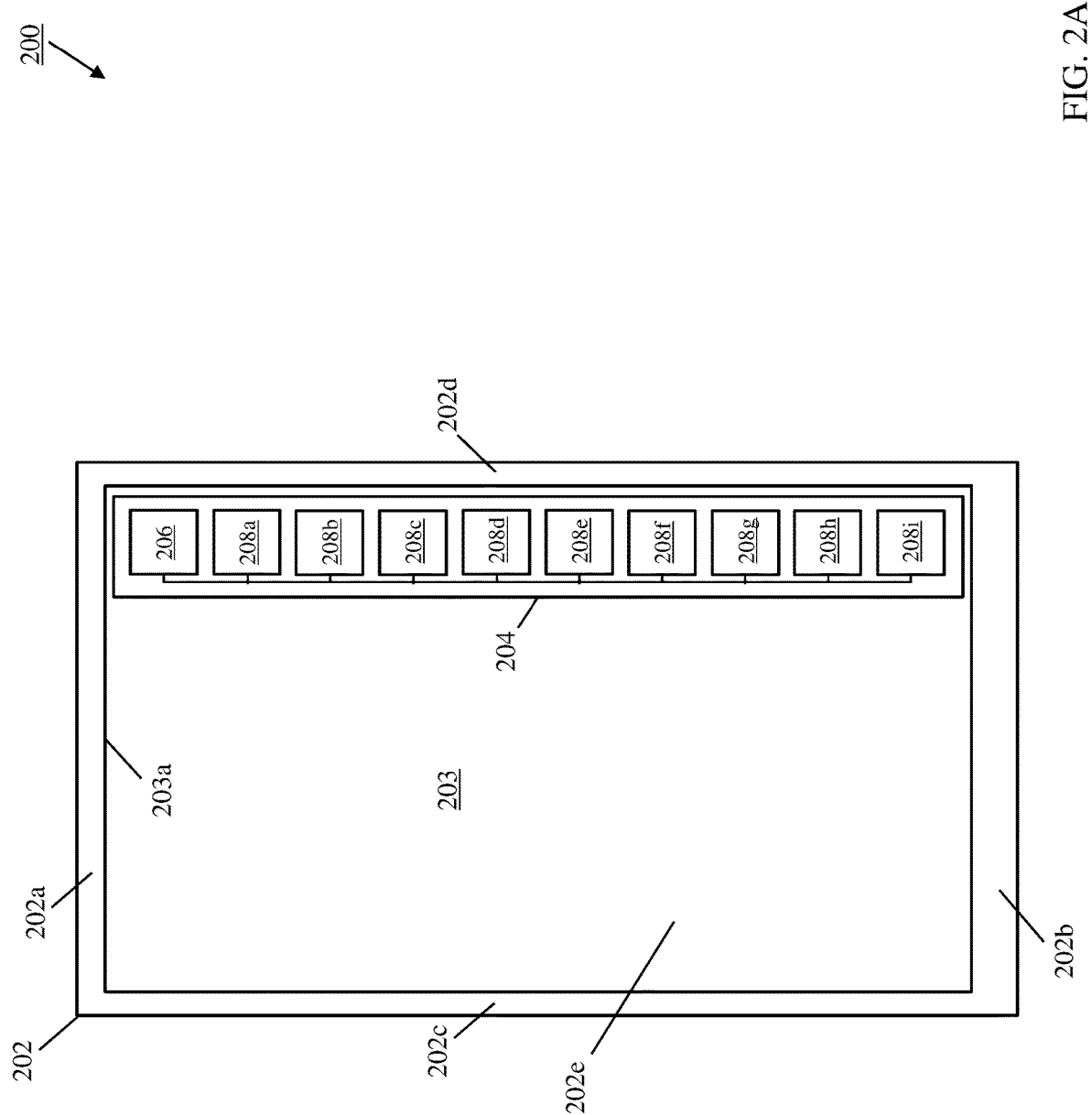
FIG. 2A is a schematic front view illustrating an embodiment of a multi-computing-device rack system provided with a Reconfigurable Intelligent Surface (RIS) system according to the teachings of the present disclosure.
Figure 2B:
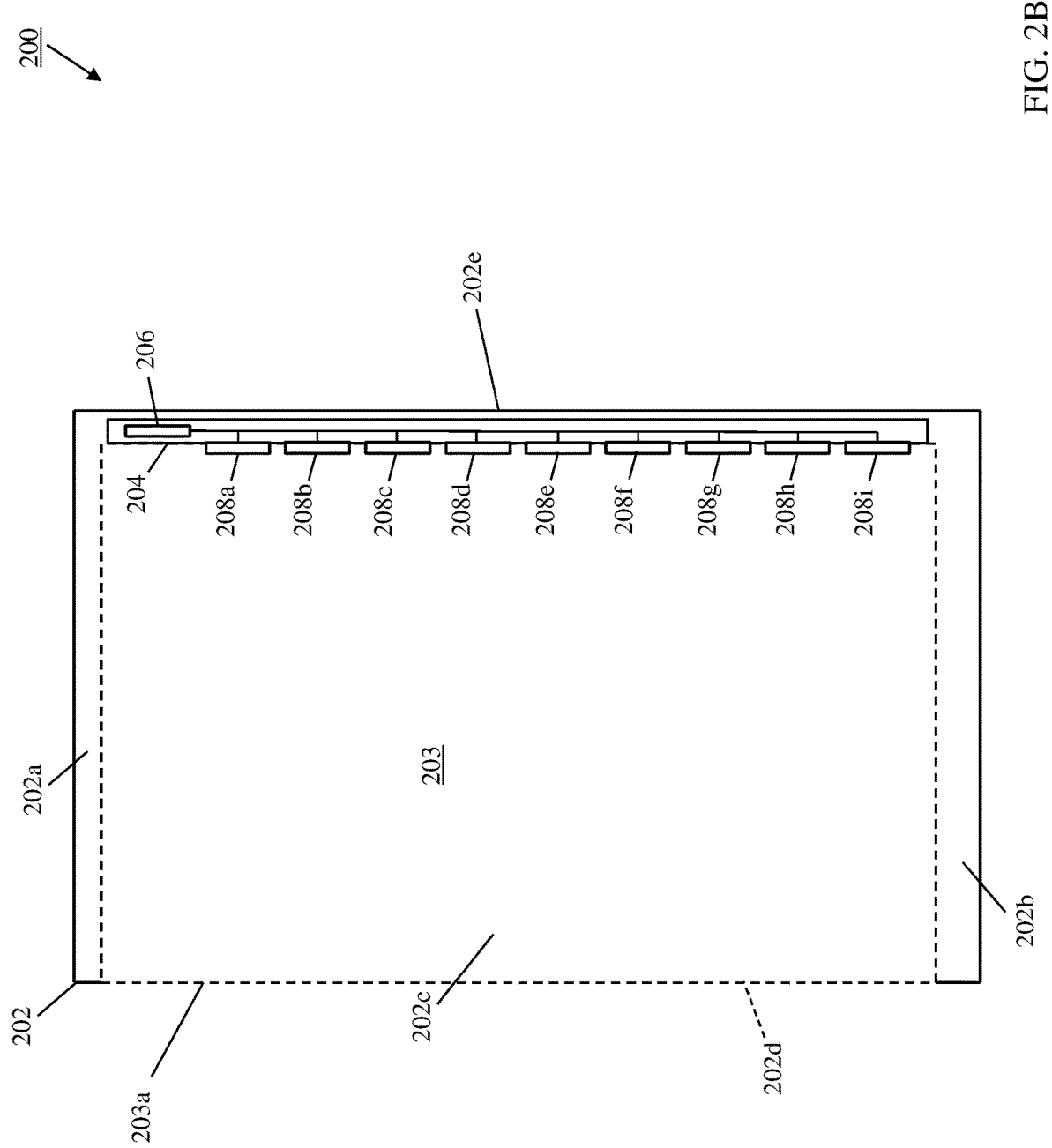
FIG. 2B is a schematic side/cut-away view illustrating an embodiment of the multi-computing-device rack system of FIG. 2A.

Referring now to FIGS. 2A and 2B, an embodiment of a multi-computing-device rack system 200 is illustrated. In the illustrated embodiment, the multi-computing-device rack system 200 includes a rack 202 having a top wall 202a, a bottom wall 202b that is located opposite the rack 202 from the top wall 202a, a pair of side walls 202c and 202d that extend between the top wall 202a and the bottom wall 202b and that are located opposite the rack 202 from each other, and a rear wall 202e that extends between the top wall 202a, the bottom wall 202b, and the side walls 202c and 202d. In the illustrated embodiment, the top wall 202a, the bottom wall 202b, the side walls 202c and 202d, and the rear wall 202e define a device housing 203 having a device housing entrance 203a that is defined between the top wall 202a, the bottom wall 202b, and the side walls 202c and 202d, and that is located opposite the rear wall 202e. However, while illustrated and discussed as including a rear wall 202e that extends between the top wall 202a, the bottom wall 202b, and the side walls 202c and 202d, one of skill in the art in possession of the present disclosure will appreciate that the rear wall 202e of the rack 202 may be omitted or may only extend over portions of the area between top wall 202a, the bottom wall 202b, and the side walls 202c and 202d in order to, or example, allow airflow through the housing entrance 203a and out the rear portion of the rack 202 (e.g., via airflow channels/apertures on the rear wall 202e).

In the illustrated embodiment, a Reconfigurable Intelligent Surface (RIS) system 204 is included on the rear wall 202e of the rack 202 and adjacent the side wall 202d. As will be appreciated by one of skill in the art in possession of the present disclosure, the positioning of the RIS system 204 illustrated herein may be provided to ensure cabling or other computing device/rack elements do not obstruct the transmission of light-modulated data discussed in further detail below. In a specific example, the RIS system 204 may be provided on a hinged door (e.g., hinged to the side wall 202d opposite the device housing entrance 203a) that allows the RIS system 204 to be moved (e.g., from the position illustrated in FIGS. 2A and 2B to a position that is approximately parallel and co-planar with the side wall 202d) in order to allow access to the device housing 203. Furthermore, one of skill in the art in possession of the present disclosure will appreciate how the RIS system 204 may be moved from the position illustrated in FIGS. 2A and 2B to, for example, a similar position on the side wall 202d that may ensure that cabling or other computing device/rack elements do not obstruct the transmission of light-modulated data discussed in further detail below, as well as ensure that airflow through the rack 200 is not impeded. However, while several specific options for the positioning of the RIS system 204 are illustrated and described, one of skill in the art in possession of the present disclosure will appreciate how the RIS system 204 may be positioned in a variety of locations in the rack 202 that will provide for the RIS/LiFi rack communication functionality discussed below, and thus those locations are envisioned as falling within the scope of the present disclosure as well.

In the illustrated embodiment, the RIS system 204 includes a RIS control subsystem 206 that is coupled to a plurality of RIS devices 208a, 208b, 208c, 208d, 208e, 208f, 208g, 208h, and 208i. In an embodiment, each of the RIS devices 208a-208i may include a programmable surface structure that is configurable (via voltages applied to the RIS device) to change the electric, magnetic, reflective, and/or other properties of that surface structure in order to control the propagation of electromagnetic waves that provide the light-modulated data discussed below. As such, the RIS devices 208a-208i may include metallic resonators, electronically-driven elements (e.g., PIN diodes, varactor diodes, etc.), Field Programmable Gate Arrays (FPGAs), and/or other RIS components that one of skill in the art in possession of the present disclosure would recognize as allowing the RIS-device-applied voltages described herein to enable the RIS device to manipulate electromagnetic waves with subwavelength resolution in real time. However, while particular RIS devices are described, the inventors of the present disclosure envision RIS technology to advance in the coming years to utilize other components and/or component configurations that may leverage the teachings provided herein to provide the functionality discussed below while remaining within the scope of the present disclosure as well.

In the embodiments illustrated and described herein, the RIS system 204 provides a respective RIS device adjacent each computing device "slot" in the rack 202. However, one of skill in the art in possession of the present disclosure will recognize how a single RIS device may be utilized with multiple computing devices (similar to the manner described for the single RIS device/computing device examples discussed below), and thus any of the RIS devices 208a-208i may be provided adjacent multiple computing device slots in the rack 202 while remaining within the scope of the present disclosure as well. As such, while multiple RIS devices 208a-208i are illustrated and described as being included in the RIS system 204, the RIS system 204 may operate with at least one RIS device for multiple computing devices to provide the functionality discussed below while remaining within the scope of the present disclosure as well. However, while a specific multi-computing-device rack system 200 has been illustrated and described, one of skill in the art in possession of the present disclosure will recognize that the RIS/LiFi rack communication system of the present disclosure may be provided using a variety of other components and component configurations while remaining within the scope of the present disclosure as well.

Figure 3:
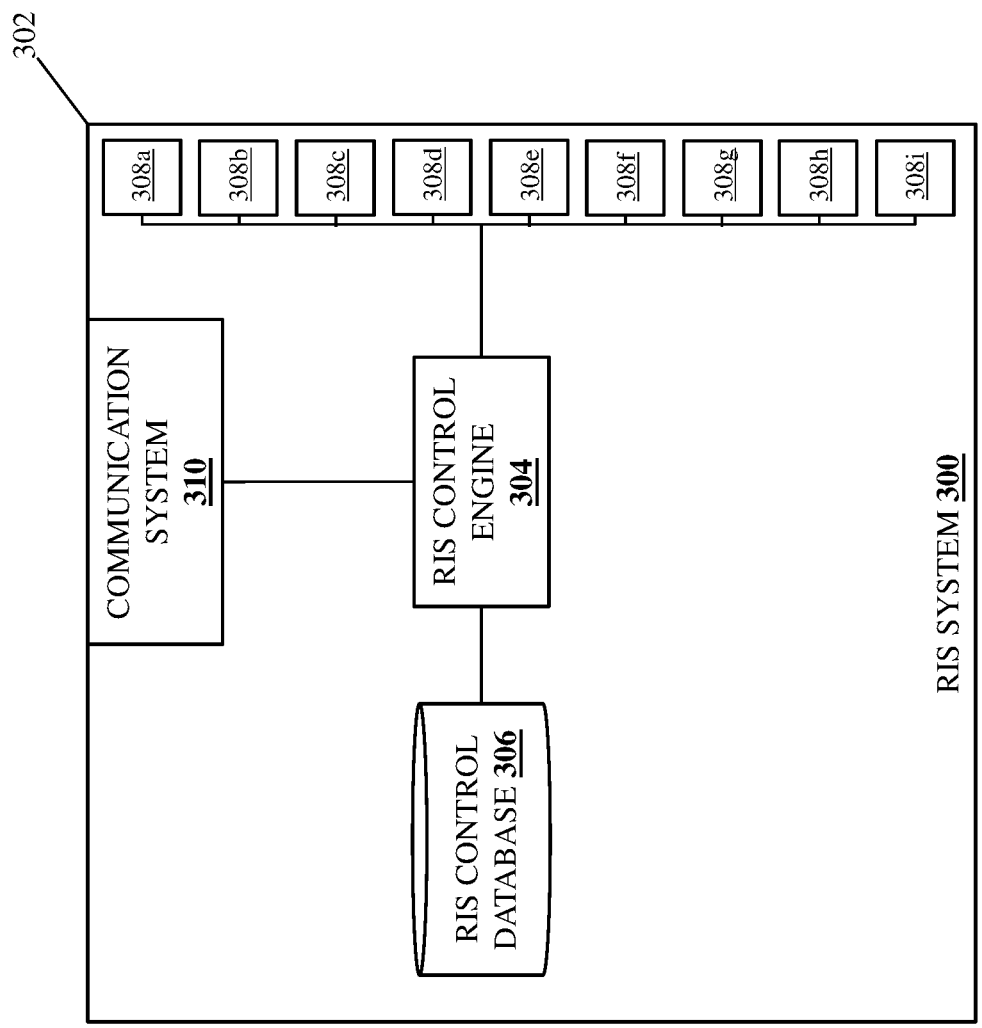
FIG. 3 is a schematic view illustrating an embodiment of a RIS system that may be included in the multi-computing-device rack system of FIGS. 2A and 2B.

Referring now to FIG. 3, an embodiment of a RIS system 300 is illustrated that may provide the RIS system 204 in the multi-computing-device rack system 200 discussed above with reference to FIG. 2. In an embodiment, the RIS system 300 may be provided by the IHS 100 discussed above with reference to FIG. 1 and/or may include some or all of the components of the IHS 100. In the illustrated embodiment, the RIS system 300 includes a chassis 302 that houses the components of the RIS system 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RIS control engine 304 that is configured to perform the functionality of the RIS control engines, RIS control subsystems, and/or RIS systems discussed below.

The chassis 302 may also house a storage system (not illustrated, but which may include the storage 108 discussed above with reference to FIG. 1) that is coupled to the RIS control engine 304 (e.g., via a coupling between the storage system and the processing system) and that includes a RIS control database 306 that is configured to store any of the information utilized by the RIS control engine 304 discussed below. The chassis 302 may also house a plurality of RIS devices 308a, 308b, 308c, 308d, 308e, 308f, 308g, 308h, and 308i, each of which is coupled to the RIS control engine 304 (e.g., via a coupling between the RIS devices 308a-308i and the processing system). As will be appreciated by one of skill in the art in possession of the present disclosure, the RIS devices 308a-308i may provide the RIS devices 208a-208i discussed above with reference to FIG. 2.

The chassis 302 may also house a communication system 310 that is coupled to the RIS control engine 304 (e.g., via a coupling between the communication system 310 and the processing system), and that may include a Network Interface Controller (NIC), wireless communication components (e.g., BLUETOOTH® wireless components, Near Field Communication (NFC) components, etc.), and/or other communication components that would be apparent to one of skill in the art in possession of the present disclosure. However, while a specific RIS system 300 has been illustrated and described, one of skill in the art in possession of the present disclosure will recognize that RIS systems (or other devices operating according to the teachings of the present disclosure in a manner similar to that described below for the RIS system 300) may include a variety of components and/or component configurations for providing conventional RIS system functionality, as well as the functionality discussed below, while remaining within the scope of the present disclosure as well.

Figure 4:
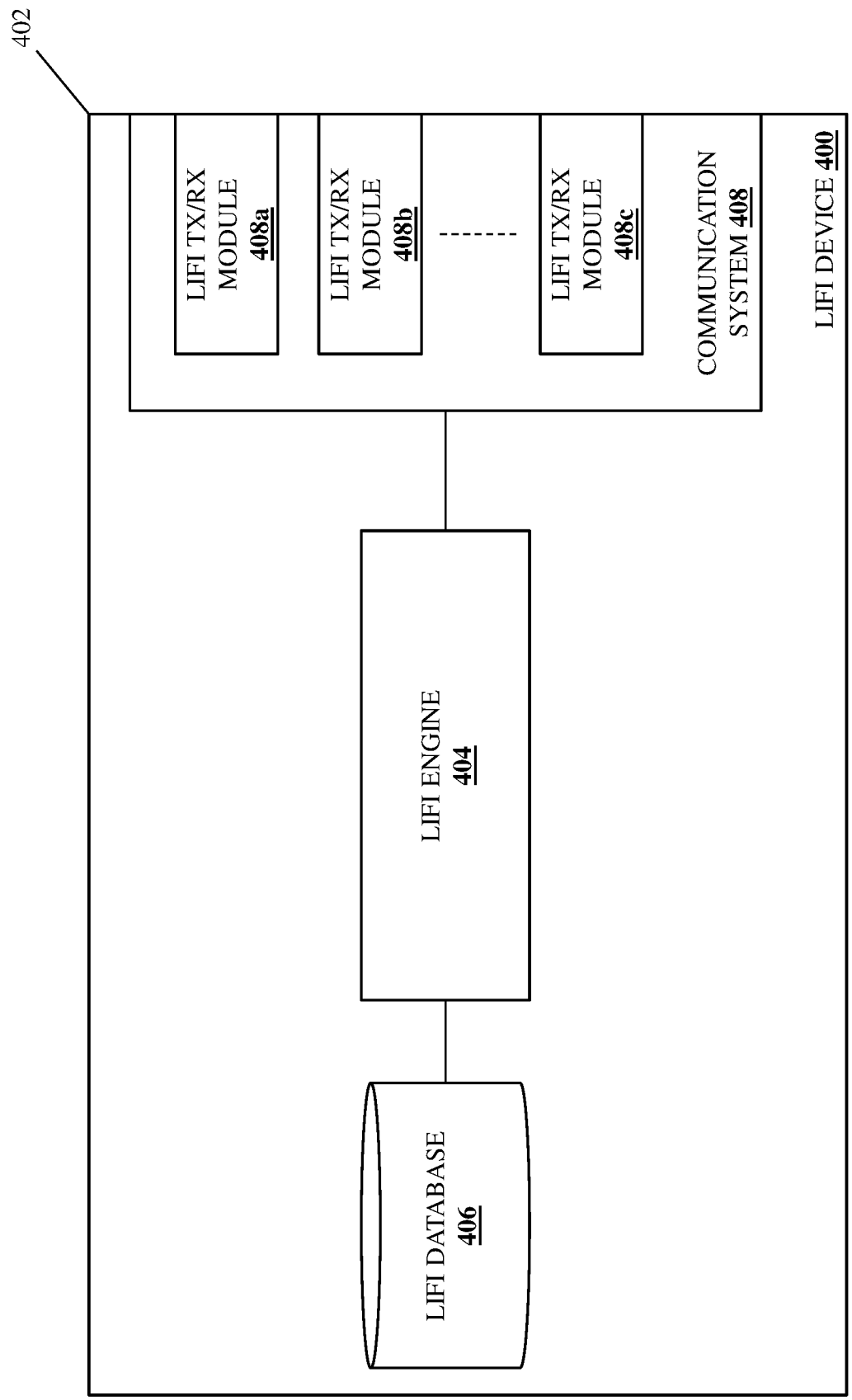
FIG. 4 is a schematic view illustrating an embodiment of a LiFi device that may be provided in the multi-computing device rack system of FIGS. 2A and 2B.

Referring now to FIG. 4, an embodiment of a Light Fidelity (LiFi) device 400 is illustrated that may be provided in the multi-computing-device rack system 200 discussed above with reference to FIG. 2 in order to provide the RIS/LiFi rack communication system of the present disclosure. In an embodiment, the LiFi device 400 may be provided by the IHS 100 discussed above with reference to FIG. 1 and/or may include some or all of the components of the IHS 100, and in specific examples is provided by a "Top Of Rack (TOR)" LiFi transmitter/receiver device. Furthermore, while illustrated and discussed as being provided by a TOR LiFi device, one of skill in the art in possession of the present disclosure will recognize that the functionality of the LiFI device 400 discussed below may be provided by other devices that are configured to operate similarly as LiFi device discussed below. In the illustrated embodiment, the LiFi device 400 includes a chassis 402 that houses the components of the LiFi device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a LiFi engine 404 that is configured to perform the functionality of the LiFi engines and/or LiFi devices discussed below.

The chassis 402 may also house a storage system (not illustrated, but which may include the storage 108 discussed above with reference to FIG. 1) that is coupled to the LiFi engine 404 (e.g., via a coupling between the storage system and the processing system) and that includes a LiFi database 406 that is configured to store any of the information utilized by the LiFi engine 404 discussed below. The chassis 402 may also house a communication system 408 that is coupled to the LiFi engine 404 (e.g., via a coupling between the communication system 408 and the processing system) and that, in the illustrated embodiment includes a plurality of LiFi transmitter/receiver (TX/RX) modules 408a, 408b, and up to 408c, that may include photodiodes and/or other LiFi components that are configured to transmit and receive/detect light, but that one of skill in the art in possession of the present disclosure will appreciate may include any other LiFi communication components and/or other communication components (e.g., Network Interface Controller (NIC) components, WiFi components, etc.) known in the art. However, while a specific LiFi device 400 has been illustrated and described, one of skill in the art in possession of the present disclosure will recognize that LiFi devices (or other devices operating according to the teachings of the present disclosure in a manner similar to that described below for the LiFi device 400) may include a variety of components and/or component configurations for providing conventional LiFi device functionality, as well as the functionality discussed below, while remaining within the scope of the present disclosure as well.

Figure 5:
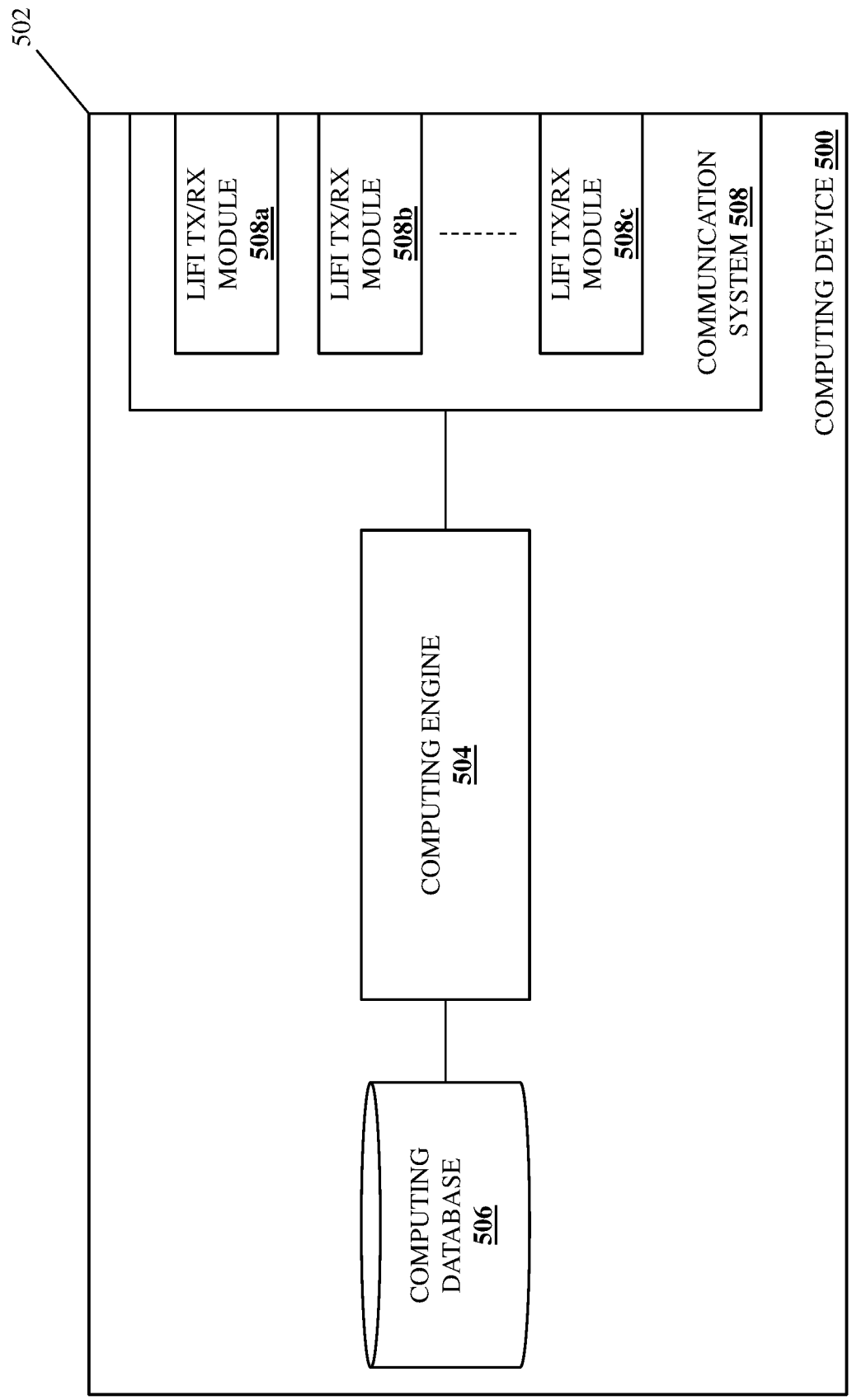
FIG. 5 is a schematic view illustrating an embodiment of a computing device that may be provided in the multi-computing-device rack system of FIGS. 2A and 2B.

Referring now to FIG. 5, an embodiment of a computing device 500 is illustrated that may be provided in the multi-computing-device rack system 200 discussed above with reference to FIG. 2 in order to provide the RIS/LiFi rack communication system of the present disclosure. As such, the computing device 500 may be provided by the IHS 100 discussed above with reference to FIG. 1 and/or may include some or all of the components of the IHS 100, and in specific examples may be provided by server devices, networking devices (e.g., switch devices), storage systems, and/or other computing devices that would be apparent to one of skill in the art in possession of the present disclosure. Furthermore, while illustrated and discussed as being provided by particular computing devices, one of skill in the art in possession of the present disclosure will recognize that the functionality of the computing device 500 discussed below may be provided by other devices that are configured to operate similarly as the computing device 500 discussed below. In the illustrated embodiment, the computing device 500 includes a chassis 502 that houses the components of the computing device 500, only some of which are illustrated and discussed below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a computing engine 504 that is configured to perform the functionality of the computing engines and/or computing devices discussed below.

The chassis 502 may also house a storage system (not illustrated, but which may include the storage 108 discussed above with reference to FIG. 1) that is coupled to the computing engine 504 (e.g., via a coupling between the storage system and the processing system) and that includes a computing database 506 that is configured to store any of the information utilized by the computing engine 504 discussed below. The chassis 502 may also house a communication system 508 that is coupled to the computing engine 504 (e.g., via a coupling between the communication system 508 and the processing system) and that, in the illustrated embodiment includes a plurality of LiFi transmitter/receiver (TX/RX) modules 508a, 508b, and up to 508c, that may include photodiodes and/or other LiFi components that are configured to transmit and receive/detect light, but that one of skill in the art in possession of the present disclosure will appreciate may include any other LiFi communication components and/or other communication components (e.g., Network Interface Controller (NIC) components, WiFi components, etc.) known in the art. However, while a specific computing device 500 has been illustrated and described, one of skill in the art in possession of the present disclosure will recognize that computing devices (or other devices operating according to the teachings of the present disclosure in a manner similar to that described below for the computing device 500) may include a variety of components and/or component configurations for providing conventional computing device functionality, as well as the functionality discussed below, while remaining within the scope of the present disclosure as well.

Figure 6:
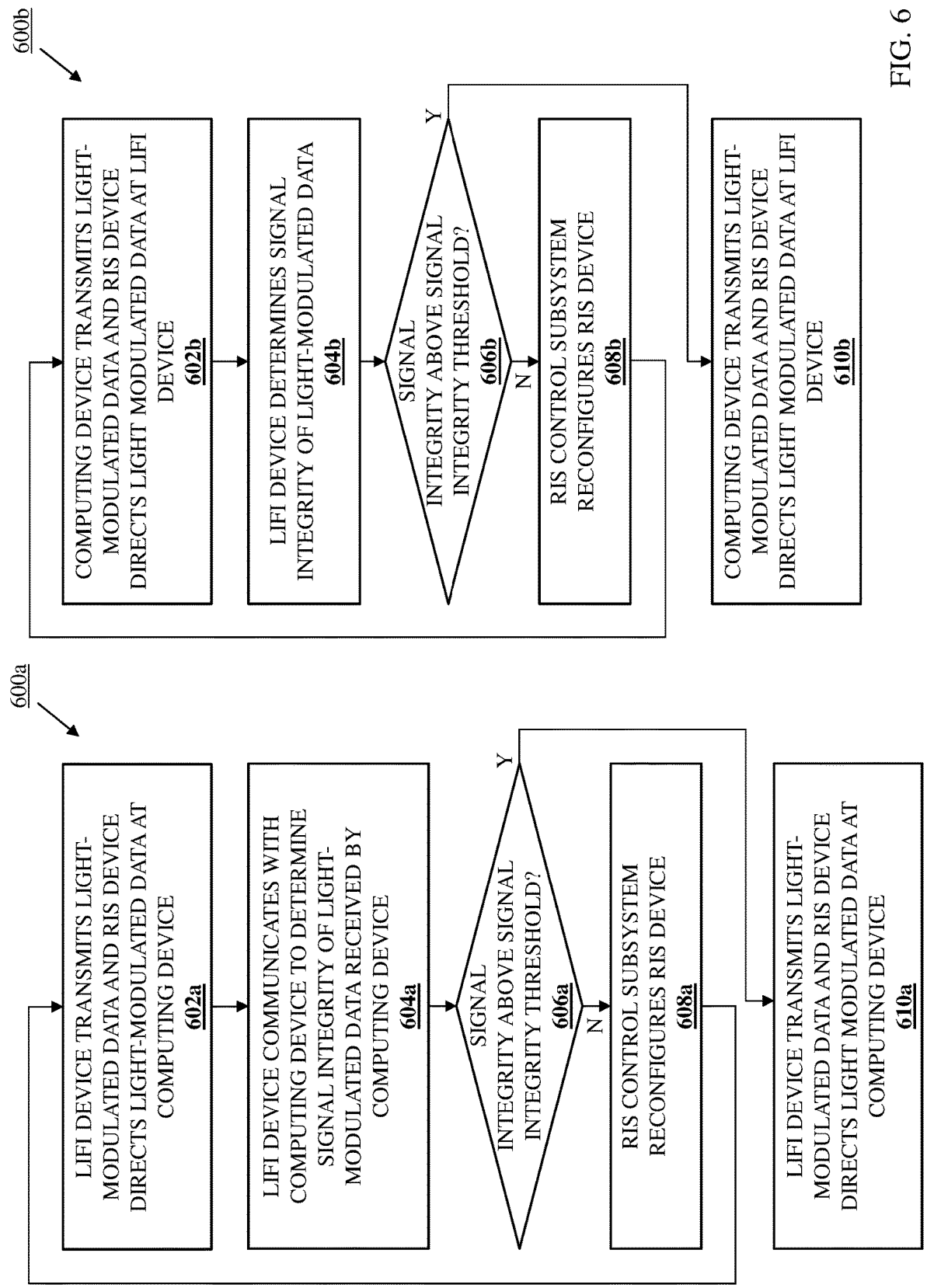
FIG. 6 is a flow chart illustrating an embodiment of a method for providing RIS/LiFi communications.

Referring now to FIG. 6, an embodiment of a method for providing Reconfigurable Intelligent Surface (RIS)/Light Fidelity (LiFi) communications is illustrated. As discussed below, the systems and methods of the present disclosure provide LiFi communications in a rack by "tuning" or otherwise configuring RIS devices to direct light-modulated data between a LiFi device and computing device such that a threshold level of signal integrity is provided with any light-modulated data that is received. For example, the RIS/LiFi rack communication system of the present disclosure may include a rack including a computing device, a LiFi device that transmits first light-modulated data, and a RIS system. The RIS system includes a RIS device that directs the first light-modulated data transmitted by the LiFi Device at the computing device, and a RIS control subsystem that is coupled to the at least one RIS device. The RIS control subsystem determines a first signal integrity of the first light-modulated data received by the computing device via the RIS device when the RIS device includes a first configuration, and reconfigures the RIS device with a second configuration such that the first light-modulated data received by the computing device via the RIS device includes a second signal integrity that is greater than the first signal integrity. As such, LiFi communications may be provided between a LiFi device and computing devices in a rack while ensuring those LiFi communications satisfy any number of signal integrity characteristics.

As discussed below, the method may include a pair of sub-methods: a first sub-method 600a that "tunes" or otherwise configures LiFi communications transmitted by a LiFi device to computing device(s), and a second sub-method 600b that "tunes" or otherwise configures LiFi communications transmitted by computing device(s) to the LiFi device. However, while the "tuning" or other configuration of the LiFi communications is described for both LiFi-device-transmitted LiFi communications and computing-device-transmitted LiFi communications, one of skill in the art in possession of the present disclosure will appreciate how the "tuning" or other configuration of the LiFi-device-transmitted LiFi communications may satisfy signal integrity requirements for the computing-device-transmitted LiFi communications, and vice-versa, while remaining within the scope of the present disclosure as well.

Furthermore, one of skill in the art in possession of the present disclosure will appreciate that the "tuning" or configuration of both the LiFi-device-transmitted LiFi communications and computing-device-transmitted LiFi communications may be performed, and in such embodiments the configuration of a RIS device based on the signal integrity of light-modulated data received by both the LiFi device 400 from a particular computing device, and by that particular computing device 500 from the LiFi device 400, may be performed such that the LiFi device 400 and that particular computing device receive light-modulated data with optimized signal integrities. Furthermore, while a particular order of Lifi communication "tuning" or configuration is illustrated and described, one of skill in the art in possession of the present disclosure will appreciate how the Lifi communication "tuning" or configuration described herein may be performed in a different order (i.e., the "tuning" or configuration of computing-device-transmitted LiFi communications before LiFi-device-transmitted LiFi communications) while remaining within the scope of the present disclosure as well.

Figure 7:
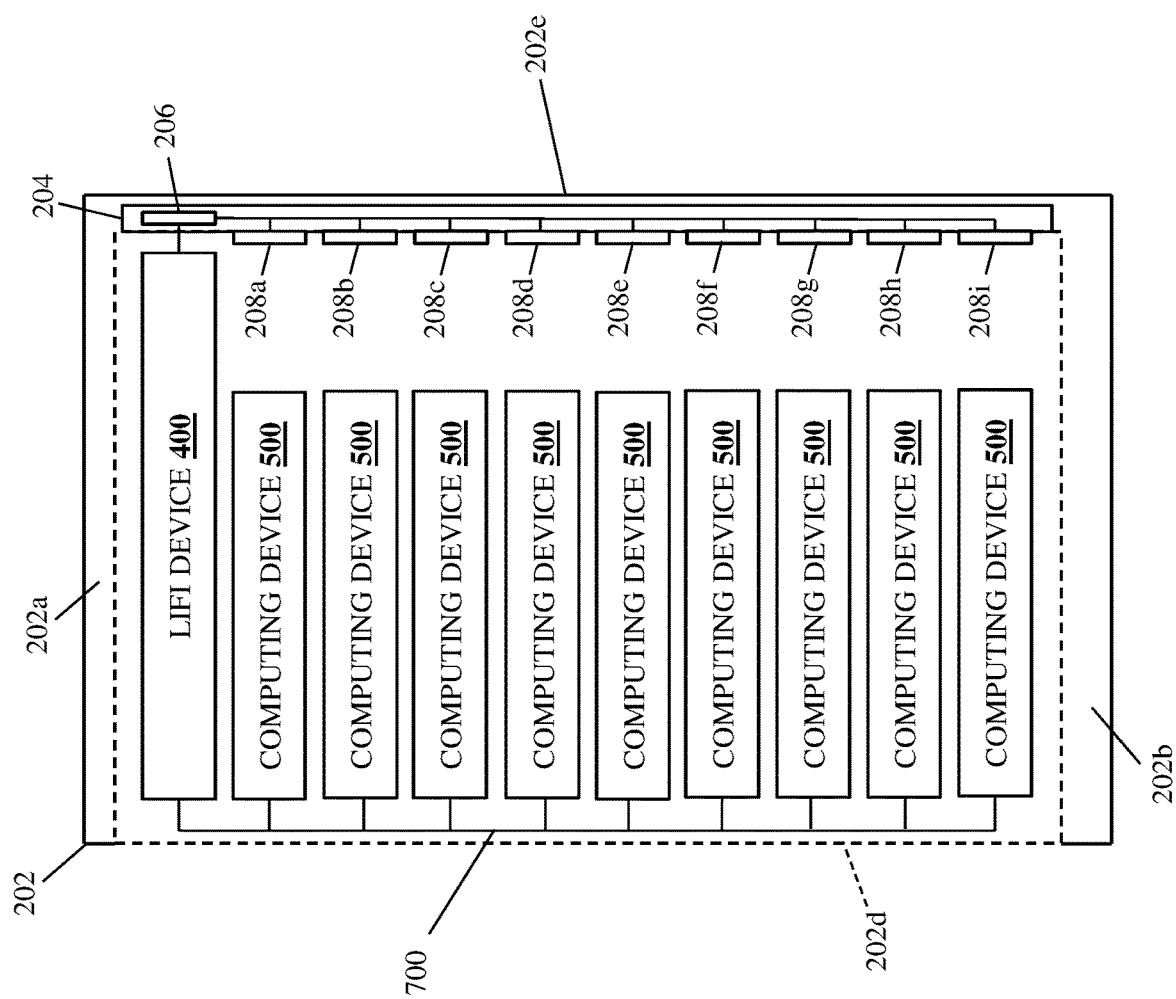
FIG. 7 is a schematic view illustrating an embodiment of the LiFi device of FIG. 4 and multiple computing devices of FIG. 5 provided in the multi-computing-device rack system of FIGS. 2A and 2B during the method of FIG. 6 to provide a RIS/LiFi rack communication system.

As illustrated in FIG. 7, during or prior to the first sub-method 600a and/or second sub-method 600b, the LiFi device 400 and a plurality of computing devices 500 may be positioned in the rack 200, with the LiFi device 400 positioned in the device housing 203 at the "top" of the rack 200 adjacent its top wall 202a (and possibly coupled to a switch, Wifi access point, or other network communication system that enables communication in a datacenter and/or an external network), and each of the plurality of computing devices 500 located in a respective device slot in the device housing 203 and adjacent a respective RIS device 208a-208i. However, as discussed below, while the illustrated embodiment includes a respective RIS device 208a-208i located adjacent each computing device 500 to provide LiFi communications for that computing device 500, other embodiments of the present disclosure may utilize a RIS device to provide LiFi communications for multiple computing devices 500, and thus a RIS device in the rack 200 that is located adjacent multiple computing devices 500 in the rack 200 and that provides LiFi communications for each of those computing devices 500 will fall within the scope of the present disclosure as well.

In the illustrated embodiment, each of the computing devices 500 is coupled to the LiFi device 400 by one or more couplings 700. For example, in some embodiments the RIS/LiFi rack communication system of the present disclosure may be utilized to transmit relatively low-speed communications (e.g., telemetry communications, management/console communications, inventory management communications, etc.) between the LiFi device 400 and the computing devices 500, while relatively high-speed communications (e.g., any of a variety of high-speed data communications known in the art) may be transmitted via cabling that provides the couplings 700. As will be appreciated by one of skill in the art in possession of the present disclosure, current LiFi communication technologies are more appropriate for the relatively low-speed communications discussed above. However, LiFi communication technologies are expected to achieve higher speeds in the future, and thus the removal of the couplings 700 (e.g., cabling) and the provisioning of any cabled communications, which are described below as being provided via the couplings 700, using the LiFi communications described herein is envisioned as falling within the scope of the present disclosure as well.

In the illustrated embodiment, the computing devices 500 are illustrated and described as including LiFi TX/RX modules 508a-508c that are integrated in the communication system 508 of those computing devices 500, with the RIS system 204/300 positioned in the rack 200 such that the RIS devices 208a-208i are oriented to direct LiFi communications between the LiFi TX/RX modules 408a-408c on the LiFi device 400 and those LiFi TX/RX modules 508a-508c on the computing devices 500. However, in other embodiments, the LiFi TX/RX modules 508a-508c may be coupled to the communication system 508 on the computing devices 500 in order to position those LiFi TX/RX modules 508a-508c in an orientation that is configured to receive LiFi communications directed by the RIS devices 208a-208i. For example, the LiFi TX/RX modules 508a-508c may be provided by LiFi TX/RX module "dongles" that may be coupled to the communication system 508 on the computing devices 500 and/or oriented in a manner that allows them to receive LiFi communications directed by the RIS devices 208a-208i. As such, one of skill in the art in possession of the present disclosure will appreciate how the computing devices 500 may be configured in a variety of manners to receive LiFi communications directed by the RIS devices 208a-208i as discussed below.

Figure 8A:
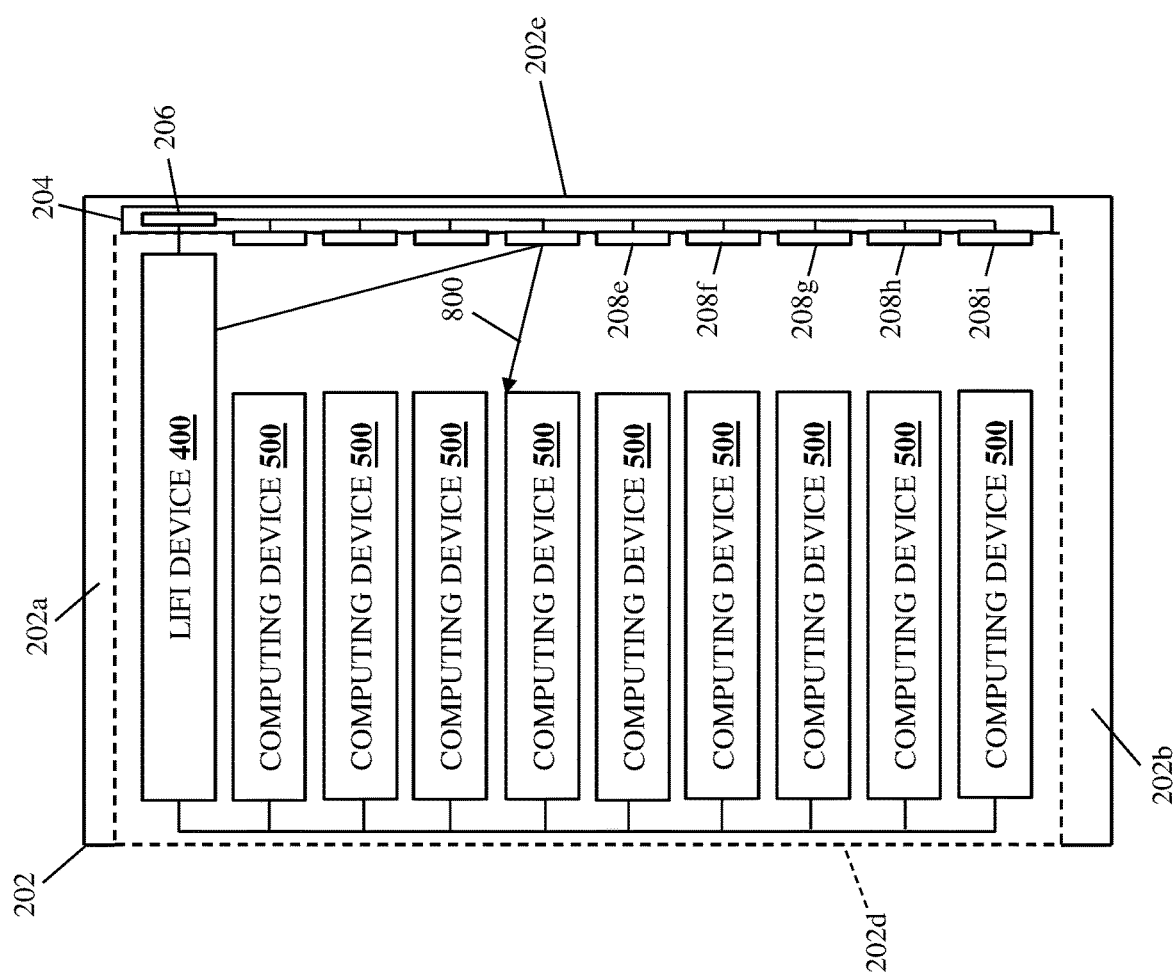
FIG. 8A is a schematic view illustrating the RIS/LiFi rack communication system of FIG. 7 operating during the method of FIG. 6.

The first sub-method 600a begins at block 602a where a LiFi device transmits light-modulated data and a RIS device directs the light-modulated data at a computing device. In the examples provided below, the first sub-method 600a is described as "tuning" or configuring LiFi communications between the LiFi device 400 and the computing device 500 located adjacent the RIS device 208d, but one of skill in the art in possession of the present disclosure will recognize how the first sub-method 600a may operate to "tune" or configure LiFi communications between the LiFi device 400 and the other computing devices 500 as well. With reference to FIG. 8A, in an embodiment of block 602a, the LiFi engine 404 in the LiFi device 400 may perform light-modulated data transmission operations that include any operations configured to cause any of its LiFi TX/RX modules 408a-408c in its communication system 408 to generate and transmit light-modulated data 800 towards the RIS device 208d, with the RIS device 208d operating to direct the light-modulated data 800 towards its adjacent computing device 500.

As will be appreciated by one of skill in the art in possession of the present disclosure, during an initial performance of block 602a of the first sub-method 600a, the programmable surface structure on the RIS device 208d may be configured (e.g., via a "default" voltage applied to the RIS device 208d by the RIS control subsystem 206) such that it includes first electric, magnetic, reflective, and/or other properties that provide for the direction of the light-modulated data 800 in the manner illustrated in FIG. 8A. However, while specific details of the initial configuration of the RIS device are provided above, one of skill in the art in possession of the present disclosure will appreciate that the RIS device 208d may include other initial configurations (or configuration properties) while remaining within the scope of the present disclosure as well. As such, at block 602a, the computing engine 504 in the computing device 500 located adjacent the RIS device 208d may receive, via one or more of the LiFi TX/RX modules 508a-508c in its communication system 508, the light-modulated data 800 transmitted by the LiFi device 400 and directed by the RIS device 208d as discussed above.

Figure 8B:
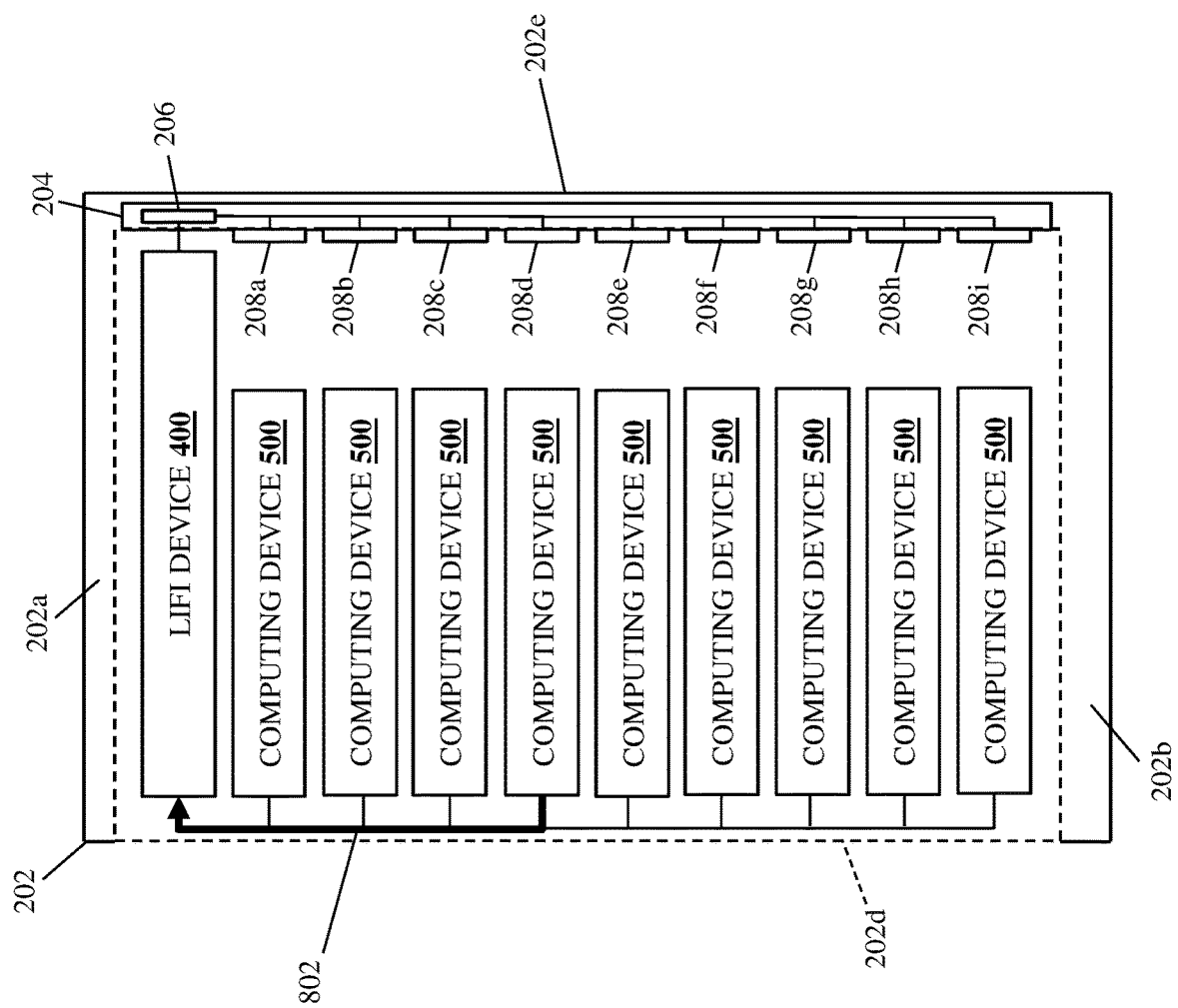
FIG. 8B is a schematic view illustrating the RIS/LiFi rack communication system of FIG. 7 operating during the method of FIG. 6.

The first sub-method 600a then proceeds to block 604a where the LiFi device communicates with the computing device to determine a signal integrity of the light-modulated data received by the computing device. With reference to FIG. 8B, in an embodiment of block 604a and in response to receiving the light-modulated data 800, the computing engine 504 in the computing device 500 located adjacent the RIS device 208d may perform light-modulated data signal integrity reporting operations 802 that include transmitting signal integrity information associated with the light-modulated data 800 received at block 602a. In some examples, the light-modulated data signal integrity reporting operations 802 may include the computing engine 504 in the computing device 500 located adjacent the RIS device 208d determining a signal integrity of the light-modulated data 800 received at block 602a, and transmitting that signal integrity to the LiFi device 400.

However, in other embodiments, the light-modulated data signal integrity reporting operations 802 may include the computing engine 504 in the computing device 500 located adjacent the RIS device 208d transmitting the light-modulated data 800 received at block 602a (or any information associated with the light-modulated data 800 received at block 602a that one of skill in the art in possession of the present disclosure would recognize as allowing for the determination of a signal integrity of that light-modulated data) to the LiFi device 400, with the LiFi engine 404 in the LiFi device 400 then operating to determine the signal integrity of the light-modulated data 800 received by the computing device 500 adjacent the RIS device 208d at block 602a. Furthermore, while two specific examples are provided, one of skill in the art in possession of the present disclosure will recognize that the LiFi device 400 may determine the signal integrity of light-modulated data received by any of the computing devices 500 using any of a variety of techniques while remaining within the scope of the present disclosure as well.

The first sub-method 600a then proceeds to decision block 606a where it is determined whether the signal integrity is above a signal integrity threshold. In an embodiment, at decision block 606a, the LiFi engine 404 in the LiFi device 400 may compare the signal integrity of light-modulated data 800 received by the computing device 500 adjacent the RIS device 208d at block 602a to a signal integrity threshold (e.g., a signal integrity threshold that is stored in the LiFi database 406) to determine whether that signal integrity is above the signal integrity threshold. However, while the computing device 500 or the LiFi device 400 are described as determining whether the signal integrity of the light-modulated data received by the computing device 500 is above the signal integrity threshold, one of skill in the art in possession of the present disclosure will appreciate how the RIS control subsystem 206 in the RIS system 204 may receive information associated with the light-modulated data received by the computing device 500 (e.g., from the LiFi device 400), and determine whether the signal integrity of the light-modulated data received by the computing device 500 is above the signal integrity threshold, while remaining within the scope of the present disclosure as well.

Furthermore, while a particular "signal integrity threshold" is described, one of skill in the art in possession of the present disclosure will appreciate how a signal integrity threshold may be dynamic, and may be utilized by the LiFi engine 404 in the LiFi device 400 to maximize the signal integrity of any light-modulated data received by any computing device 500 in the rack 200 while remaining within the scope of the present disclosure as well. As such, rather than iterating the first sub-method 600a until the signal integrity of light-modulated data received by a computing device is above a signal integrity threshold as described in the simplified example provided herein, the first sub-method 600a may be iterated to increase the signal integrity of light-modulated data received by a computing device until a maximum signal integrity is reached, the change in signal integrity is below a signal integrity change threshold, and/or based on other signal integrity characteristics that would be apparent to one of skill in the art in possession of the present disclosure.

Figure 8C:
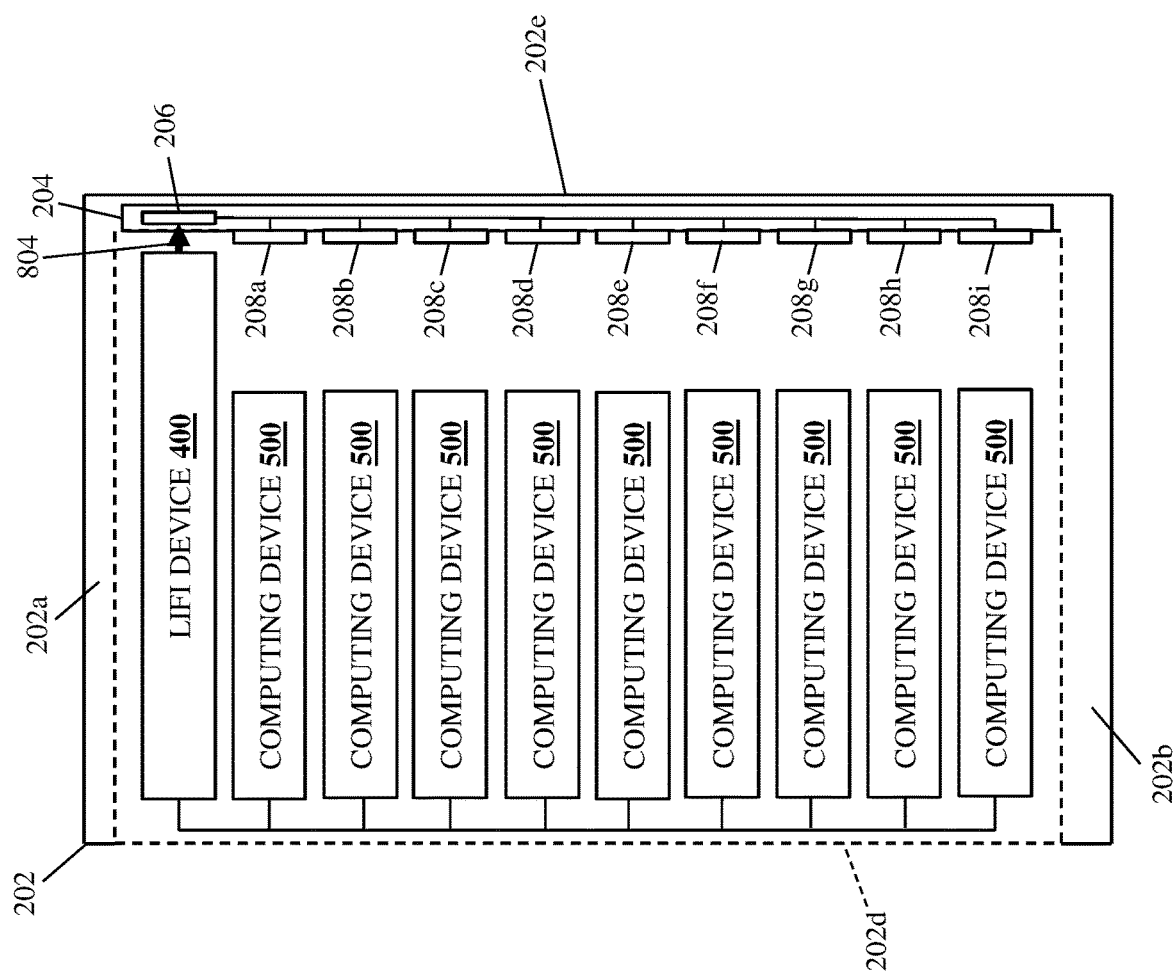
FIG. 8C is a schematic view illustrating the RIS/LiFi rack communication system of FIG. 7 operating during the method of FIG. 6.

If, at decision block 606a, it is determined that the signal integrity is not above the signal integrity threshold, the first sub-method 600a proceeds to block 608a where a RIS control subsystem reconfigures the RIS device. With reference to FIG. 8C, in an embodiment of block 608a, the LiFi engine 404 in the LiFi device 400 may perform RIS device reconfiguration instruction operations 804 that include generating and transmitting a RIS device reconfiguration instruction via its communication system 408 and to the RIS control subsystem 206 in the RIS system 204. In some embodiments, the LiFi engine 404 in the LiFi device 400 may determine a voltage modification that may be provided by the RIS control subsystem 204 to the RIS device 208d to produce a reconfiguration of the RIS device 208d, and then transmit a voltage modification instruction as part of the RIS device reconfiguration instructions. In other embodiments, the LiFi engine 404 in the LiFi device 400 may transmit a request to reconfigure the RIS device 208d as part of the RIS device reconfiguration instruction, and the RIS control subsystem 206 may determine a voltage modification that may be provided to the RIS device 208d to produce a reconfiguration of the RIS device 208d. However, while a few specific examples are provided, the RIS device reconfiguration instruction transmitted by the LiFi device 400 to the RIS system 204 may include any information that is configured to provide for the RIS device reconfiguration discussed below while remaining within the scope of the present disclosure.

Figure 8D:
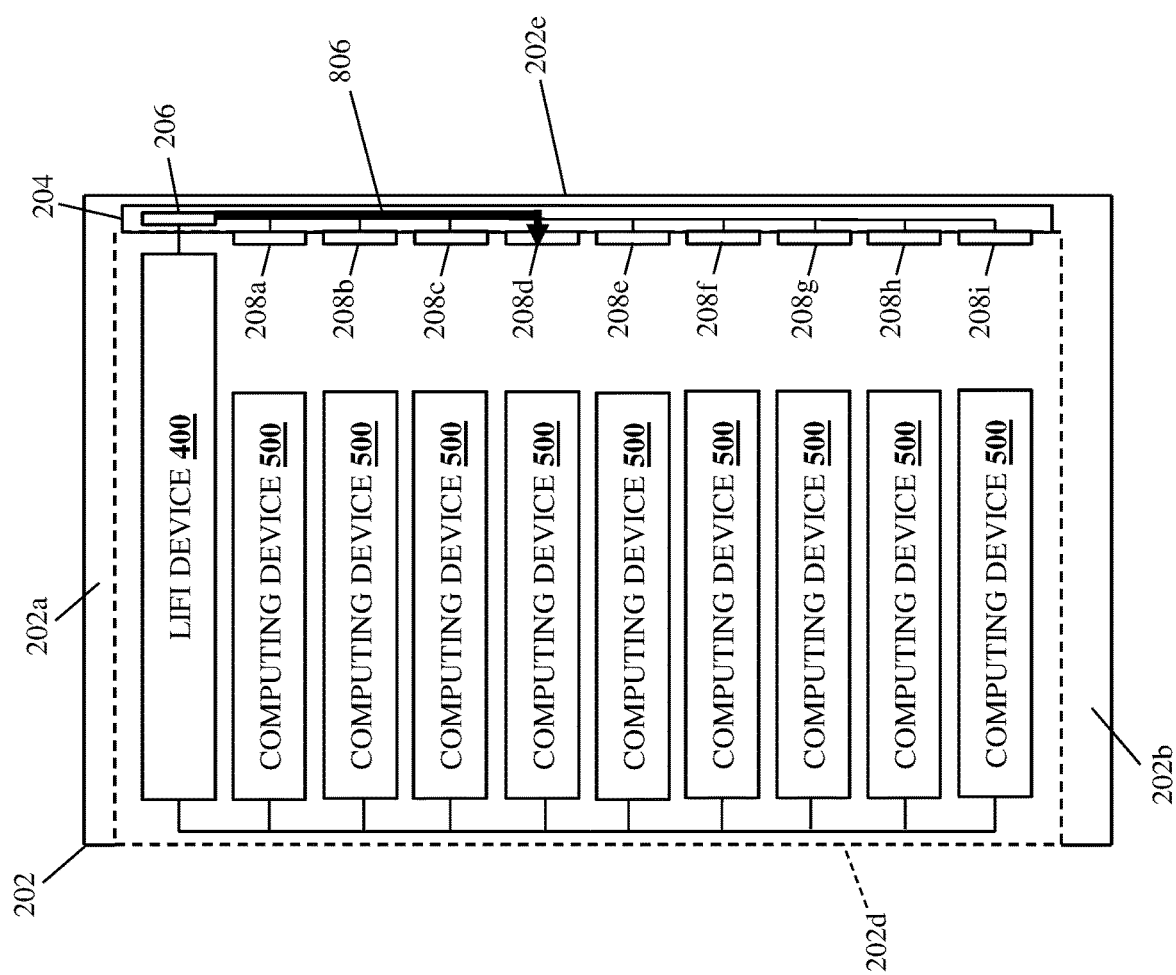
FIG. 8D is a schematic view illustrating the RIS/LiFi rack communication system of FIG. 7 operating during the method of FIG. 6.

As such, at block 608a, the RIS control engine 304/RIS control subsystem 206 in the RIS system 204/300 may receive the RIS device reconfiguration instruction via its communication system 310. With reference to FIG. 8D, in response to receiving the RIS device reconfiguration instruction, the RIS control engine 304/RIS control subsystem 206 in the RIS system 204/300 may perform RIS device reconfiguration operations 806 that may include modifying a voltage provided to the RIS device 208d in order to reconfigure the RIS device 208a. As will be appreciated by one of skill in the art in possession of the present disclosure, during the performance of block 608a of the firsts sub-method 600a, the programmable surface structure on the RIS device 208d may be reconfigured (e.g., via the modification of the voltage applied to the RIS device 208d by the RIS control subsystem 206 as discussed above) such that it includes second electric, magnetic, reflective, and/or other properties that are different than the first electric, magnetic, reflective, and/or other properties of the RIS device 208d discussed above with reference to block 602a. However, while specific details of the modification of the configuration of the RIS device are provided above, one of skill in the art in possession of the present disclosure will appreciate that the RIS device 208d may include other modified configurations (or other modified configuration properties) while remaining within the scope of the present disclosure as well.

Figure 9A:
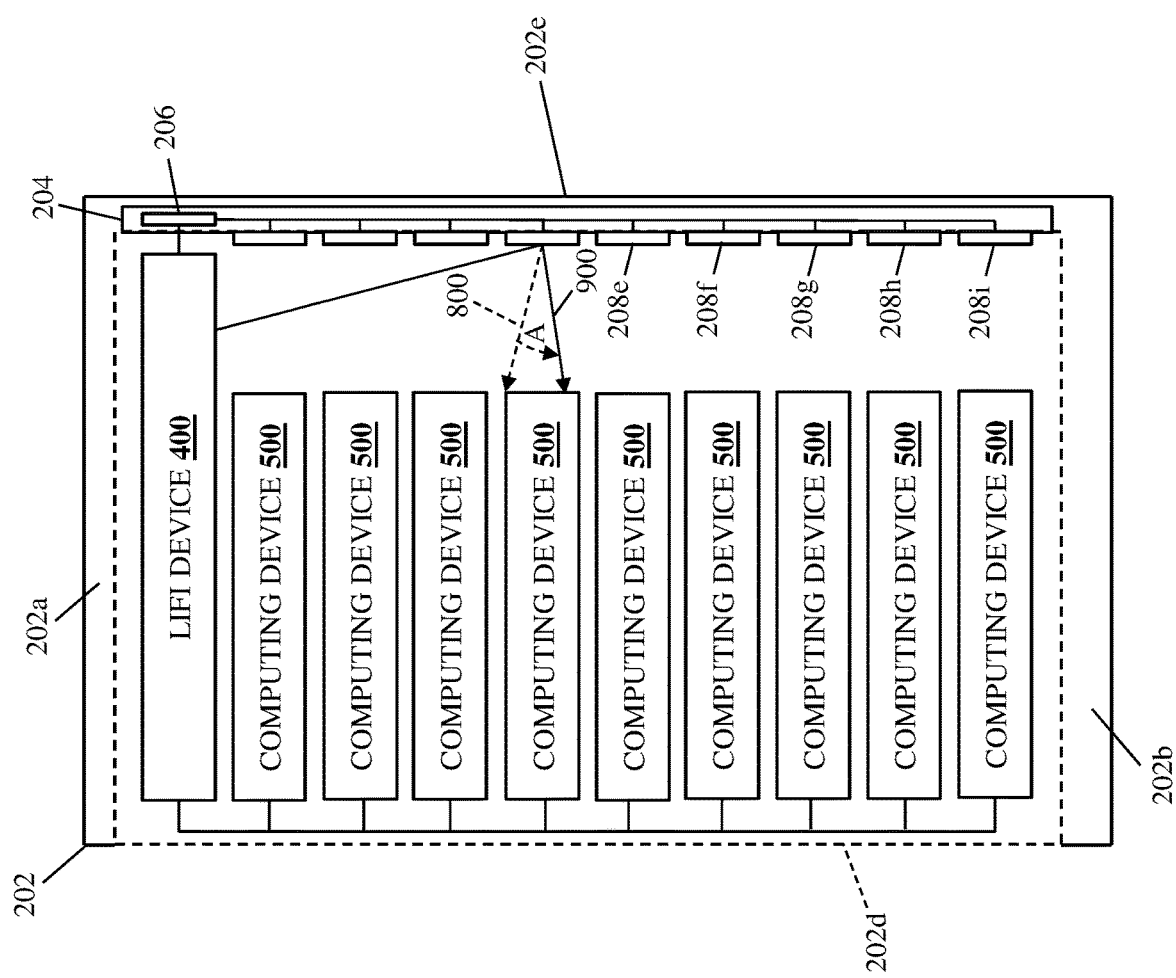
FIG. 9A is a schematic view illustrating the RIS/LiFi rack communication system of FIG. 7 operating during the method of FIG. 6.
Figure 9B:
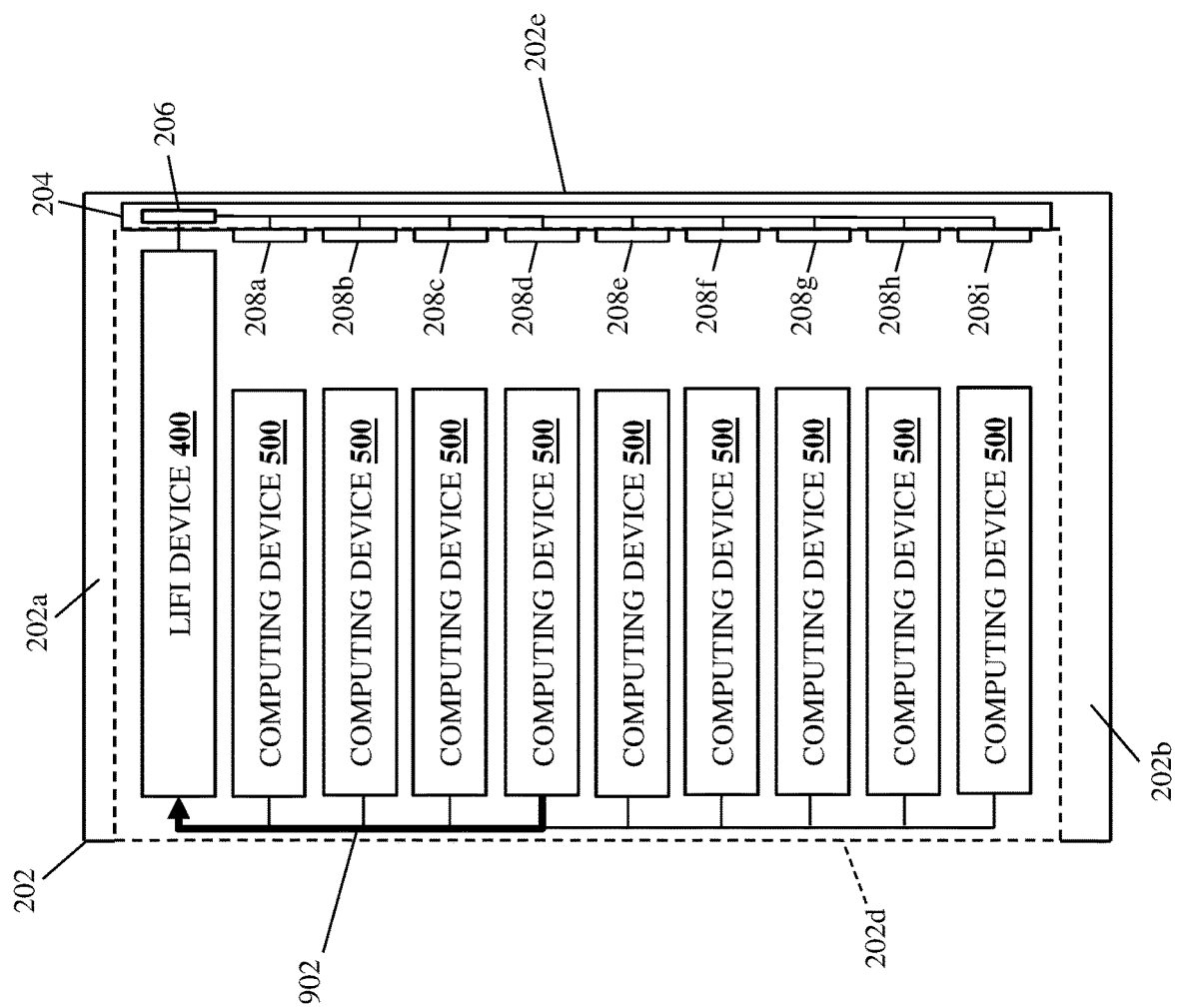
FIG. 9B is a schematic view illustrating the RIS/LiFi rack communication system of FIG. 7 operating during the method of FIG. 6.

The first sub-method 600a then returns to block 602a, and blocks 602a, 604a, 606a, and 608a may be repeated until the signal integrity of the light-modulated data received by the computing device 500 adjacent the RIS device 208d is above the signal integrity threshold. For example, FIG. 9A illustrates how, following the modification of the configuration of the RIS device 208d during the iteration of the first sub-method 600a discussed above, the light-modulated data 800 transmitted by the LiFi device 400 in FIG. 8A (illustrated in dashed lines in FIG. 9A) is redirected by the RIS device 208d during block 602a of the second iteration of the first sub-method 600a to provide redirected light-modulated data 900 that, in the specific simplified example illustrated in FIG. 9A has been redirected by an angle A. FIG. 9B then illustrate how block 604a of the second iteration of the first sub-method 600a may include the LiFi device 400 communicating (e.g., via light-modulated data signal integrity reporting operations 902) with the computing device 500 adjacent the RIS device 208d to determine a signal integrity of the redirected light-modulated data 900 received by the computing device 500, as the LiFi device 400 determining whether that signal integrity is above the signal integrity threshold at decision block 606a of the second iteration of the first sub-method 600a.

As such, one of skill in the art in possession of the present disclosure will appreciate how any light-modulated data transmitted by the LiFi device 400 and directed by the RIS devices 208a-208i to any of the computing devices 500 in the rack 200 may be redirected towards that computing device 500 via reconfiguration of the corresponding RIS device(s) 208a-208i until the signal integrity of the light-modulated data received by that computing device 500 is optimized, maximized, above a signal integrity threshold, and/or otherwise at a desired level. For example, the configuration of the RIS device adjacent any computing device 500 may redirect the light-modulated data transmitted by the LiFi device 400 to different locations on an outer surface of that computing device 500 until the LiFi TX/RX modules 508a-508c on that computing device 500 receive that light-modulated data with a signal integrity that is optimized, maximized, above a signal integrity threshold, and/or otherwise at a desired level.

If at decision block 606a, it is determined that the signal integrity is above the signal integrity threshold, the first sub-method 600a proceeds to block 610a where the LiFi device transmits light-modulated data and the RIS device directs the light-modulated data at the computing device. In an embodiment, at block 610a and following the "tuning" or other configuration of the LiFi communications between the LiFi device 400 and the computing devices 500 discussed above, the LiFi engine 404 in the LiFi device 400 may generate and transmit light-modulated data that is then directed by the RIS devices 208a-208i to the computing devices 500 using the configuration provided for those RIS devices during blocks 602a, 604a, 606a, and 608a of the first sub-method 600a. In a specific example, the light-modulated data generated and transmitted by the LiFi device 400 at block 602a may be "tuning" data, "configuration" data, "test" data, and/or other data that is configured for use in performing the signal integrity determination operations at block 604a, while the light-modulated data generated and transmitted by the LiFi device 400 at block 610a may be "runtime" data utilized in the telemetry communications, management/console communications, inventory management communications, and/or other relatively low-speed communications discussed above (as well as the relatively high-speed communications discussed above in other embodiments as well). However, one of skill in the art in possession of the present disclosure will appreciate how the "runtime" data discussed above may be utilized during the first sub-method 600a while remaining within the scope of the present disclosure as well.

Figure 10A:
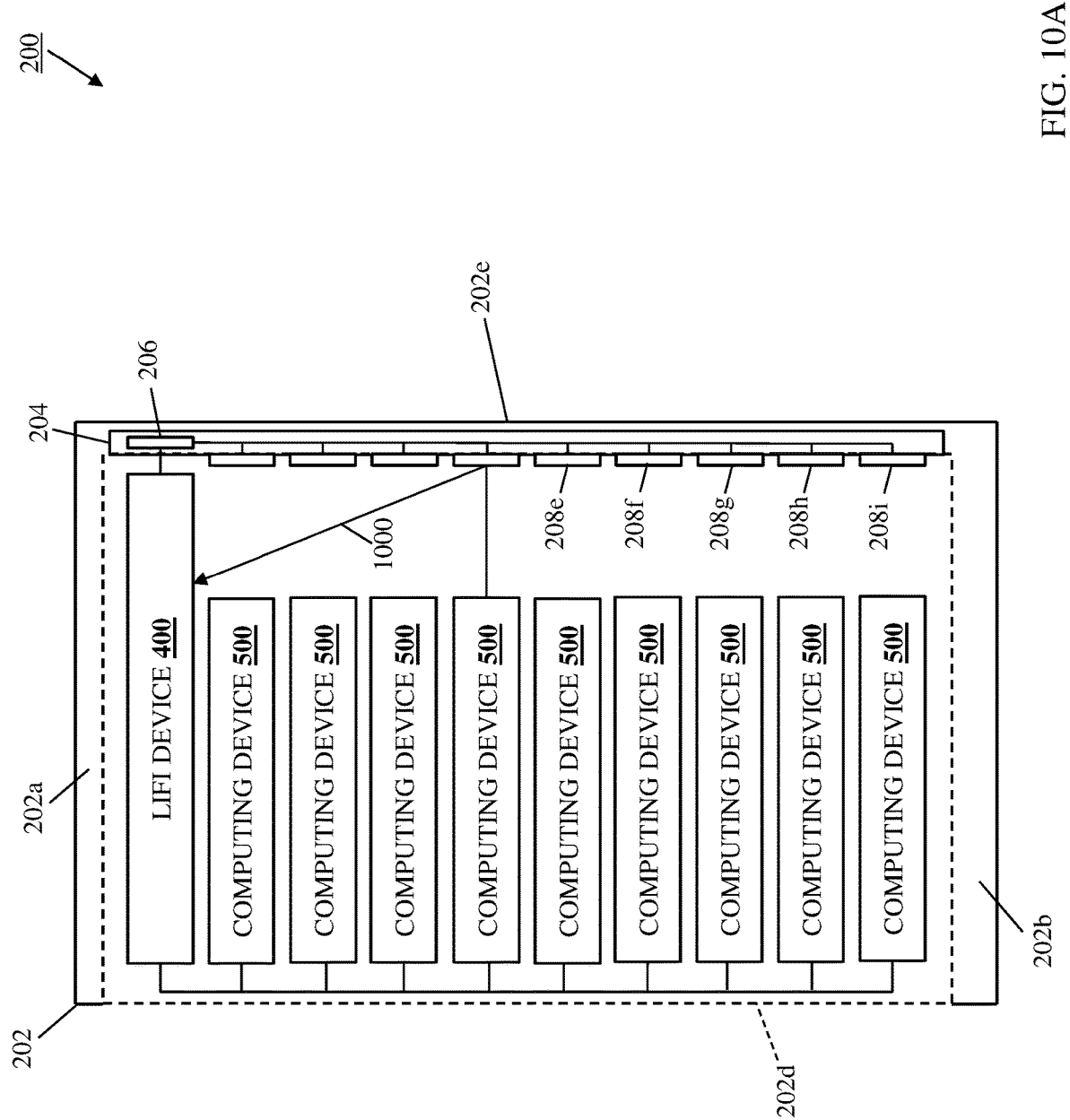
FIG. 10A is a schematic view illustrating the RIS/LiFi rack communication system of FIG. 7 operating during the method of FIG. 6.

The second sub-method 600b begins at block 602b where the computing device transmits light-modulated data and the RIS device directs the light-modulated data at the LiFi device. In the examples provided below, the second sub-method 600b is described as "tuning" or configuring LiFi communications between the computing device 500 located adjacent the RIS device 208d and the LiFi device 400, but one of skill in the art in possession of the present disclosure will recognize how the second sub-method 600b may operate to "tune" or configure LiFi communications between other computing devices 500 and the LiFi device 400 as well. With reference to FIG. 10A, in an embodiment of block 602b, the computing engine 504 in the computing device 500 may perform light-modulated data transmission operations that may include any operations that cause any of its LiFi TX/RX modules 508a-508c in its communication system 508 to generate and transmit light-modulated data 1000 towards the RIS device 208d, with the RIS device 208d operating to direct the light-modulated data 1000 towards the LiFi device 400.

As will be appreciated by one of skill in the art in possession of the present disclosure, during an initial performance of block 602b of the second sub-method 600b, the programmable surface structure on the RIS device 208d may be configured (e.g., via a "default" voltage applied to the RIS device 208d by the RIS control subsystem 206) such that it includes first electric, magnetic, reflective, and/or other properties that provide for the direction of the light-modulated data 1000 in the manner illustrated in FIG. 10A. However, while specific details of the initial configuration of the RIS device are provided above, one of skill in the art in possession of the present disclosure will appreciate that the RIS device 208d may include other initial configurations (or configuration properties) while remaining within the scope of the present disclosure as well. As such, at block 602b, the LiFi engine 404 in the LiFi device 400 may receive, via one or more of the LiFi TX/RX modules 408a-408c in its communication system 408, the light-modulated data 1000 transmitted by the computing device 500 and directed by the RIS device 208d as discussed above.

The second sub-method 600b then proceeds to block 604b where the LiFi device determines a signal integrity of the light-modulated data. In an embodiment of block 604b and in response to receiving the light-modulated data 1000, the LiFi engine 404 in the LiFi device 400 may determine the signal integrity of the light-modulated data 1000 using any of a variety of signal integrity determination techniques that would be apparent to one of skill in the art in possession of the present disclosure. Furthermore, one of skill in the art in possession of the present disclosure will recognize that the LiFi device 400 may determine the signal integrity of light-modulated data received from any of the computing devices 500 using any of a variety of techniques while remaining within the scope of the present disclosure as well.

The second sub-method 600b then proceeds to decision block 606b where it is determined whether the signal integrity is above a signal integrity threshold. In an embodiment, at decision block 606b, the LiFi engine 404 in the LiFi device 400 may compare the signal integrity of light-modulated data 1000 received at block 602b to a signal integrity threshold (e.g., a signal integrity threshold that is stored in the LiFi database 406) to determine whether that signal integrity is above the signal integrity threshold. However, while the LiFi device 400 is described as determining whether the signal integrity of the light-modulated data 1000 is above the signal integrity threshold, one of skill in the art in possession of the present disclosure will appreciate how the RIS control subsystem 206 in the RIS system 204 may receive information associated with the light-modulated data 1000 (e.g., from the LiFi device 400), and determine whether the signal integrity of the light-modulated data 1000 is above the signal integrity threshold while remaining within the scope of the present disclosure as well.

Furthermore, while a particular "signal integrity threshold" is described, one of skill in the art in possession of the present disclosure will appreciate how a signal integrity threshold may be dynamic, and may be utilized by the LiFi engine 404 in the LiFi device 400 to maximize the signal integrity of any light-modulated data received from any computing device 500 in the rack 200 while remaining within the scope of the present disclosure as well. As such, rather than iterating the second sub-method 600b until the signal integrity of light-modulated data received from a computing device is above a signal integrity threshold as described in the simplified example below, the second sub-method 600b may be iterated to increase the signal integrity of light-modulated data received from a computing device until a maximum signal integrity is reached, the change in signal integrity is below a signal integrity change threshold, and/or based on other signal integrity characteristics that would be apparent to one of skill in the art in possession of the present disclosure.

Figure 10B:
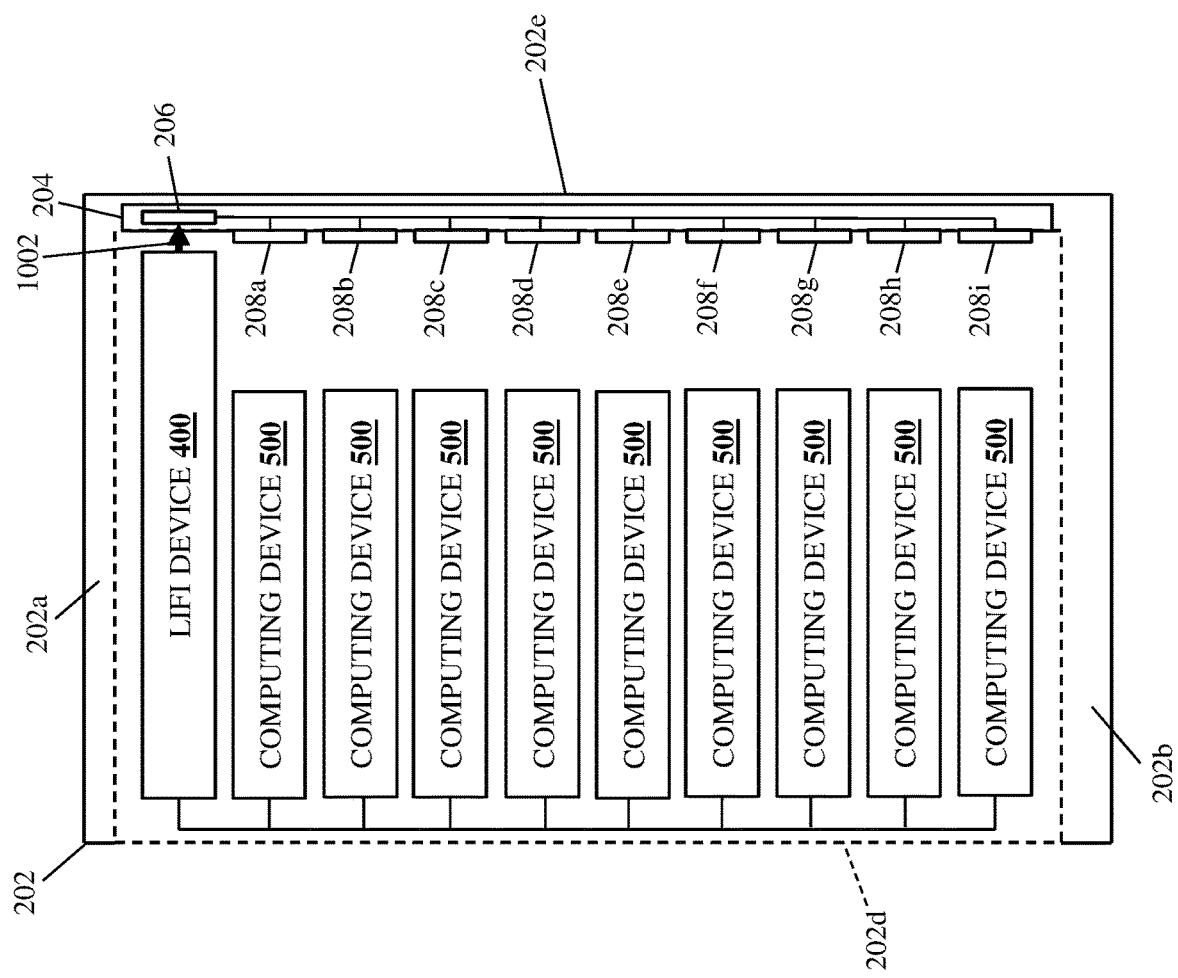
FIG. 10B is a schematic view illustrating the RIS/LiFi rack communication system of FIG. 7 operating during the method of FIG. 6.

If, at decision block 606b, it is determined that the signal integrity is not above the signal integrity threshold, the second sub-method 600b proceeds to block 608b where the RIS control subsystem reconfigures the RIS device. With reference to FIG. 10B, in an embodiment of block 608b, the LiFi engine 404 in the LiFi device 400 may perform RIS device reconfiguration instruction operations 1002 that include generating and transmitting a RIS device reconfiguration instruction via its communication system 408 and to the RIS control subsystem 206 in the RIS system 204. In some embodiments, the LiFi engine 404 in the LiFi device 400 may determine a voltage modification that may be provided by the RIS control subsystem 204 to the RIS device 208d to produce a desired reconfiguration of the RIS device 208d, and transmit a voltage modification instruction as part of the RIS device reconfiguration instructions. In other embodiments, the LiFi engine 404 in the LiFi device 400 may transmit a request to reconfigure the RIS device 208d as part of the RIS device reconfiguration instruction, and the RIS control subsystem 206 may determine a voltage modification that may be provided to the RIS device 208d to produce a desired reconfiguration of the RIS device 208d. However, while a few specific examples are provided, the RIS device reconfiguration instruction transmitted by the LiFi device 400 to the RIS system 204 may include any information that is configured to provide for the RIS device reconfiguration discussed below while remaining within the scope of the present disclosure.

Figure 10C:
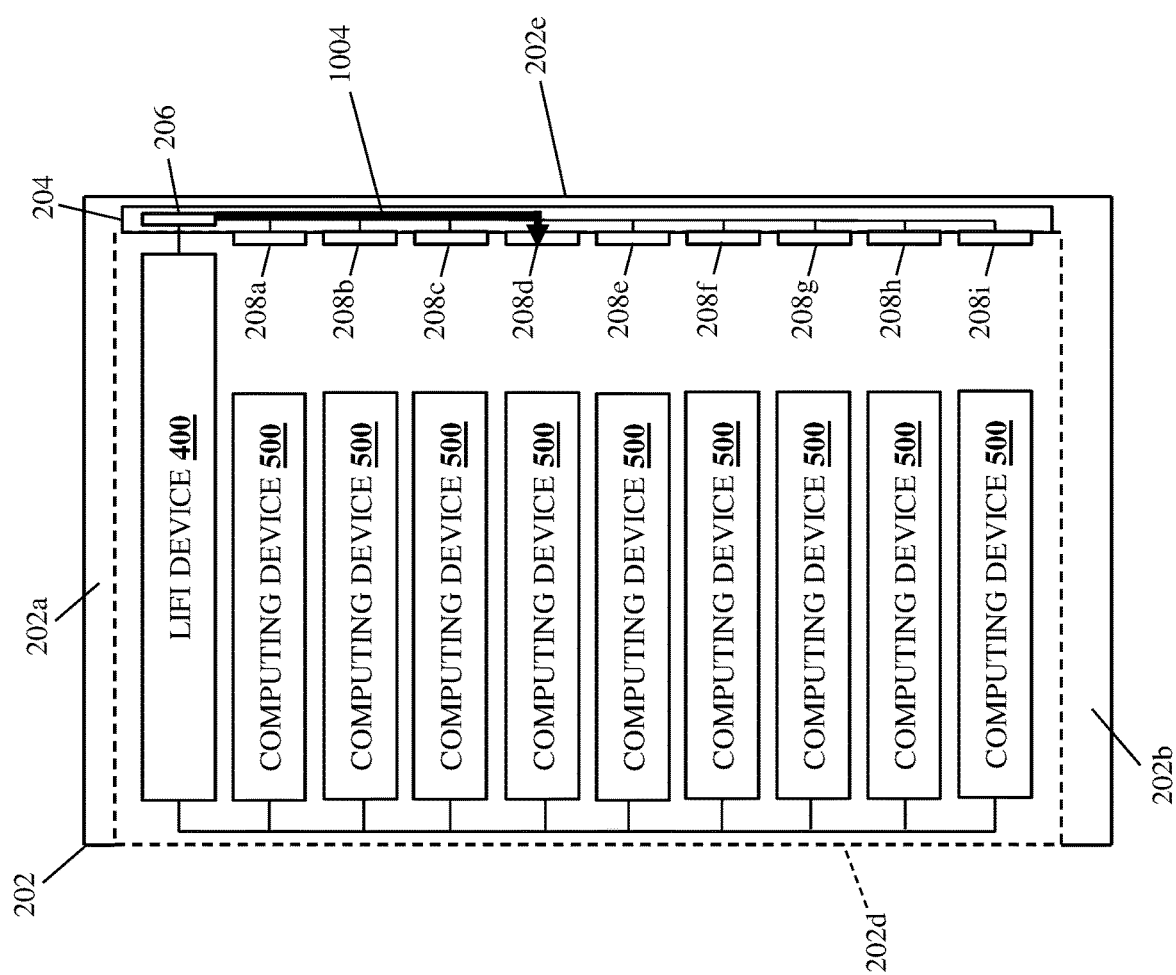
FIG. 10C is a schematic view illustrating the RIS/LiFi rack communication system of FIG. 7 operating during the method of FIG. 6.

As such, at block 608b, the RIS control engine 304/RIS control subsystem 206 in the RIS system 204/300 may receive the RIS device reconfiguration instruction via its communication system 310. With reference to FIG. 10C, in response to receiving the RIS device reconfiguration instruction, the RIS control engine 304/RIS control subsystem 206 in the RIS system 204/300 may perform RIS device reconfiguration operations 1004 that may include modifying a voltage provided to the RIS device 208d in order to reconfigure the RIS device 208a. As will be appreciated by one of skill in the art in possession of the present disclosure, during the performance of block 608b of the second sub-method 600b, the programmable surface structure on the RIS device 208d may be reconfigured (e.g., via the modification of the voltage applied to the RIS device 208d by the RIS control subsystem 206 as discussed above) such that it includes second electric, magnetic, reflective, and/or other properties that are different than the first electric, magnetic, reflective, and/or properties of the RIS device 208d discussed above with reference to FIG. 602b. However, while specific details of the modification of the configuration of the RIS device are provided above, one of skill in the art in possession of the present disclosure will appreciate that the RIS device 208d may include other modified configurations (or other modified configuration properties) while remaining within the scope of the present disclosure as well.

Figure 11:
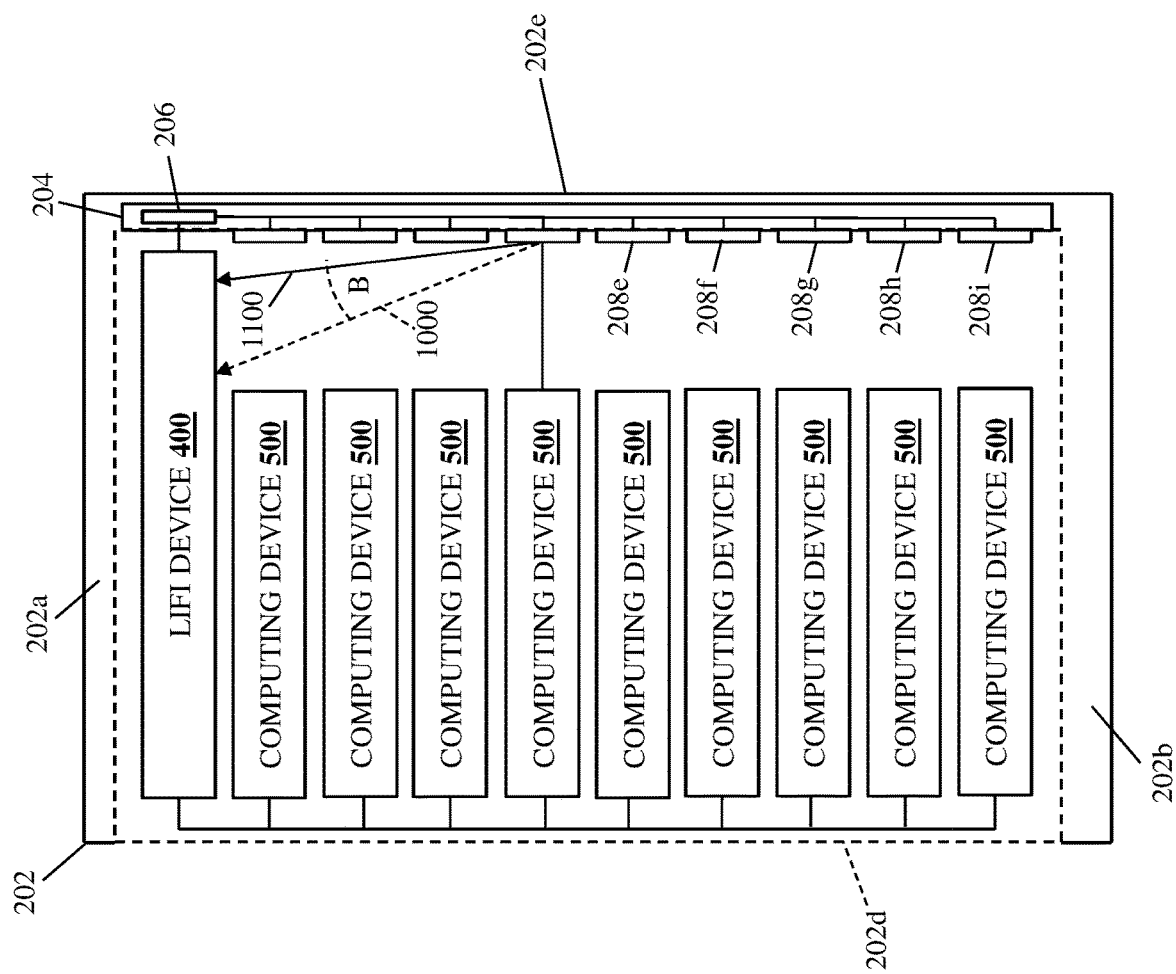
FIG. 11 is a schematic view illustrating the RIS/LiFi rack communication system of FIG. 7 operating during the method of FIG. 6.

The second sub-method 600b then returns to block 602b, and blocks 602b, 604b, 606b, and 608b may be repeated until the signal integrity of the light-modulated data received from the computing device 500 adjacent the RIS device 208d is above the signal integrity threshold. For example, FIG. 11 illustrates how, following the modification of the configuration of the RIS device 208d during the iteration of the second sub-method 600b discussed above, the light-modulated data 1000 transmitted by the LiFi device 400 in FIG. 10A (illustrated in dashed lines in FIG. 11) is redirected by the RIS device 208d during block 602b of the second iteration of the second sub-method 600b to provide redirected light-modulated data 1100 that, in the specific example illustrated in FIG. 11 has been redirected by an angle B. One of skill in the art in possession of the present disclosure will recognize how block 604b of the second iteration of the second sub-method 600b may include the LiFi device 400 determining a signal integrity of the redirected light-modulated data 1100 received from the computing device 500.

As such, one of skill in the art in possession of the present disclosure will appreciate how any light-modulated data transmitted by any of the computing devices 500 in the rack 200 and directed by the RIS devices 208a-208i to the LiFi device 400 may be redirected towards the LiFi device 400 via reconfiguration of the corresponding RIS device(s) 208a-208i until the signal integrity of the light-modulated data received by the LiFi device 400 from that computing device 500 is optimized, maximized, above a signal integrity threshold, and/or otherwise at a desired level. For example, the configuration of the RIS device adjacent any computing device 500 may redirect the light-modulated data transmitted by that computing device 500 to different locations on an outer surface of the LiFi device 400 until the LiFi TX/RX modules 408a-408c on the LiFi device 400 receive that light-modulated data with a signal integrity that is optimized, maximized, above a signal integrity threshold, and/or otherwise at a desired level.

If at decision block 606b, it is determined that the signal integrity is above the signal integrity threshold, the second sub-method 600b proceeds to block 610b where the computing device transmits light-modulated data and the RIS device directs the light-modulated data at the LiFi device. In an embodiment, at block 610b and following the "tuning" or other configuration of the LiFi communications between the computing devices 500 and the LiFi device 400 discussed above, the computing engine 504 in the computing devices 500 may generate and transmit light-modulated data that is then directed by the RIS devices 208a-208i to the LiFi device 400. For example, the light-modulated data generated and transmitted by the computing devices 500 at block 602b may be "tuning" data, "configuration" data, "test" data, and/or other data that is configured for use in performing the signal integrity determination operations at block 604b, while the light-modulated data generated and transmitted by the computing devices 500 at block 610b may be "runtime" data utilized in the telemetry communications, management/console communications, inventory management communications, and/or other relatively low-speed communications discussed above (as well as the relatively high-speed communications discussed above in other embodiments as well). However, one of skill in the art in possession of the present disclosure will appreciate how the "runtime" data discussed above may be utilized during the second sub-method 600b while remaining within the scope of the present disclosure as well.

As discussed above, in embodiments in which both the LiFi communications transmitted by the LiFi device 400 to a particular computing device 500, and the LiFi communications transmitted by that particular computing device 500 to the LiFi device 400, are "tuned" or otherwise configured via the teachings of the methods 700 and 1200 above, the configuration provided by the RIS device that directs the light-modulated data between them may be selected to optimize the signal integrity of the light-modulated data received by both that LiFi device 400 (from that particular computing device 500) and that particular computing device 500 (from that LiFi device 400).

Thus, systems and methods have been described that provide LiFi communications in a rack via the use of one or more RIS devices to "tune" or otherwise configure light-modulated data communications between a LiFi device and computing device such that a threshold level of signal integrity is provided. For example, the RIS/LiFi rack communication system of the present disclosure may include a rack including a computing device, a LiFi device that transmits first light-modulated data, and a RIS system. The RIS system includes a RIS device that directs the first light-modulated data transmitted by the LiFi Device at the computing device, and a RIS control subsystem that is coupled to the at least one RIS device. The RIS control subsystem determines a first signal integrity of the first light-modulated data received by the computing device via the RIS device when the RIS device includes a first configuration, and reconfigures the RIS device with a second configuration such that the first light-modulated data received by the computing device via the RIS device includes a second signal integrity that is greater than the first signal integrity. As such, the systems and methods of the present disclosure provide for the effective transfer of light-modulated data within a rack, reduce or eliminate cable interference and/or rack-mounted-accessory interference with light-modulated data, provide a sustained range for LiFi access within a rack, provide better reliability for wireless communications via LiFi, and may allow light-of-sight blockage issues to be overcome dynamically.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Reconfigurable Intelligent Surface (RIS)/Light Fidelity (LiFi) rack communication system, comprising:
  a rack;
  a computing device that is included in the rack;
  a Light Fidelity (LiFi) device that is included in the rack and configured to transmit first light-modulated data; and
  a Reconfigurable Intelligent Surface (RIS) system that is included in the rack and that includes:
    a RIS device that is configured to direct the first light-modulated data transmitted by the LiFi Device at the computing device; and
    a RIS control subsystem that is coupled to the at least one RIS device and configured to:
      determine a first signal integrity of the first light-modulated data received by the computing device via the RIS device when the RIS device includes a first configuration; and
      reconfigure the RIS device with a second configuration such that the first light-modulated data received by the computing device via the RIS device includes a second signal integrity that is greater than the first signal integrity.

2. The system of claim 1, wherein the LiFi device is coupled to the computing device and the RIS control subsystem, and wherein the LiFi device is configured to:
  communicate with the computing device to determine the first signal integrity of the first light-modulated data received by the computing device; and
  report the first signal integrity of the first light-modulated data received by the computing device to the RIS control subsystem such that the RIS control subsystem determines the first signal integrity of the first light-modulated data received by the computing device.

3. The system of claim 1, wherein the RIS control subsystem is configured to:
  determine that the first signal integrity of the first light-modulated data received by the computing device is below a signal integrity threshold and in response, reconfigure the RIS device with the second configuration.

4. The system of claim 1, wherein the RIS control subsystem is configured to:
  reconfigure the RIS device with the second configuration such that the first light-modulated data received by the computing device via the RIS device includes the second signal integrity that is above a signal integrity threshold.

5. The system of claim 1, wherein reconfiguration of the RIS device includes modifying a voltage provided to the RIS device to change a first surface impedance of the RIS device that provides the first configuration to a second surface impedance of the RIS device that provides the second configuration.

6. The system of claim 1, wherein the computing device is configured to transmit second light-modulated data, the RIS device is configured to direct the second light-modulated data transmitted by the computing device at the LiFi device, and the RIS control subsystem is configured to:
  determine a third signal integrity of the second light-modulated data received by the LiFi device via the RIS device when the RIS device includes the first configuration; and
  reconfigure the RIS device with the second configuration such that the second light-modulated data received by the LiFi device via the RIS device includes a fourth signal integrity that is greater than the third signal integrity.

7. An Information Handling System (IHS), comprising:
  a processing system; and
  a memory system that is coupled to the processing system and that includes instructions that, when executed by the processing system, cause the processing system to provide a Reconfigurable Intelligent Surface (RIS) control engine that is configured to:
    determine a first signal integrity of first light-modulated data that is transmitted by a Light Fidelity (LiFi) device and received by a computing device via a RIS device when the RIS device includes a first configuration that directs the first light-modulated data transmitted by the LiFi device at the computing device; and
    reconfigure the RIS device with a second configuration that directs the first light-modulated data transmitted by the LiFi device at the computing device such that the first light-modulated data received by the computing device via the RIS device includes a second signal integrity that is greater than the first signal integrity.

8. The IHS of claim 7, wherein the RIS control engine is configured to determine the first signal integrity of the first light-modulated data received by the computing device by receiving, from the Lifi device, a report of the first signal integrity of the first light-modulated data received by the computing device that was determined by the LiFi device.

9. The IHS of claim 7, wherein the RIS control engine is configured to:
  determine that the first signal integrity of the first light-modulated data received by the computing device is below a signal integrity threshold and in response, reconfigure the RIS device with the second configuration.

10. The IHS of claim 7, wherein the RIS control engine is configured to:
reconfigure the RIS device with the second configuration such that the first light-modulated data received by the computing device via the RIS device includes the second signal integrity that is above a signal integrity threshold.

11. The IHS of claim 7, wherein reconfiguration of the RIS device includes modifying a voltage provided to the RIS device to change a first surface impedance of the RIS device that provides the first configuration to a second surface impedance of the RIS device that provides the second configuration.

12. The IHS of claim 7, wherein RIS control engine is configured to:
determine a third signal integrity of second light-modulated data that is transmitted by the computing device and received by the LiFi device via the RIS device when the RIS device includes the first configuration that directs the second light-modulated data transmitted by the computing device at the LiFi device; and
reconfigure the RIS device with the second configuration that directs the second light-modulated data transmitted by the computing device at the LiFi device such that the second light-modulated data received by the LiFi device via the RIS device includes a fourth signal integrity that is greater than the third signal integrity.

13. The IHS of claim 12, wherein the reconfiguration of the RIS device with the second configuration operates to optimize the combination of the second signal integrity of the first light-modulated data and the fourth signal integrity of the second light-modulated data.

14. A method for providing Reconfigurable Intelligent Surface (RIS)/Light Fidelity (LiFi) communications, comprising:
determining, by a Reconfigurable Intelligent Surface (RIS) control subsystem, a first signal integrity of first light-modulated data that is transmitted by a Light Fidelity (LiFi) device and received by a computing device via a RIS device when the RIS device includes a first configuration that directs the first light-modulated data transmitted by the LiFi device at the computing device; and
reconfiguring, by the RIS control subsystem, the RIS device with a second configuration that directs the first light-modulated data transmitted by the LiFi device at the computing device such that the first light-modulated data received by the computing device via the RIS device includes a second signal integrity that is greater than the first signal integrity.

15. The method of claim 14, further comprising:
determining, by the RIS control subsystem, the first signal integrity of the first light-modulated data received by the computing device by receiving, from the Lifi device, a report of the first signal integrity of the first light-modulated data received by the computing device that was determined by the LiFi device.

16. The method of claim 14, further comprising:
determining, by the RIS control subsystem, that the first signal integrity of the first light-modulated data received by the computing device is below a signal integrity threshold and in response, reconfigure the RIS device with the second configuration.

17. The method of claim 14, further comprising:
reconfiguring, by the RIS control subsystem, the RIS device with the second configuration such that the first light-modulated data received by the computing device via the RIS device includes the second signal integrity that is above a signal integrity threshold.

18. The method of claim 14, wherein reconfiguration of the RIS device includes modifying a voltage provided to the RIS device to change a first surface impedance of the RIS device that provides the first configuration to a second surface impedance of the RIS device that provides the second configuration.

19. The method of claim 14, further comprising:
determining, by the RIS control subsystem, a third signal integrity of second light-modulated data that is transmitted by the computing device and received by the LiFi device via the RIS device when the RIS device includes the first configuration that directs the second light-modulated data transmitted by the computing device at the LiFi device; and
reconfiguring, by the RIS control subsystem, the RIS device with the second configuration that directs the second light-modulated data transmitted by the computing device at the LiFi device such that the second light-modulated data received by the LiFi device via the RIS device includes a fourth signal integrity that is greater than the third signal integrity.

20. The method of claim 19, wherein the reconfiguration of the RIS device with the second configuration operates to optimize the combination of the second signal integrity of the first light-modulated data and the fourth signal integrity of the second light-modulated data.

* * * * *